US007787055B2

(12) United States Patent
Osawa et al.

(10) Patent No.: US 7,787,055 B2
(45) Date of Patent: Aug. 31, 2010

(54) SIGNAL PROCESSING METHOD, IMAGE DISPLAY APPARATUS, AND TELEVISION APPARATUS

(75) Inventors: Seiji Osawa, Aiko-gun (JP); Yukio Hiraki, Atsugi (JP); Izumi Kanai, Machida (JP); Kohei Inamura, Sagamihara (JP); Masaru Tada, Yokohama (JP); Nobuhiro Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1035 days.

(21) Appl. No.: 11/469,286

(22) Filed: Aug. 31, 2006

(65) Prior Publication Data
US 2007/0052861 A1 Mar. 8, 2007

(30) Foreign Application Priority Data
Sep. 7, 2005 (JP) ............................. 2005-259454
Aug. 15, 2006 (JP) ............................. 2006-221449

(51) Int. Cl.
*H04N 9/67* (2006.01)
(52) U.S. Cl. .................... 348/659; 345/603; 345/604
(58) Field of Classification Search ......... 348/659–661; 345/603–604; 358/535
See application file for complete search history.

(56) References Cited

U.S. PATENT DOCUMENTS

| 3,729,580 | A | * | 4/1973 | Schneider | 348/234 |
| 5,353,063 | A | | 10/1994 | Yagisawa et al. | 348/426 |
| 6,633,302 | B1 | | 10/2003 | Ohsawa et al. | 345/604 |
| 6,873,308 | B2 | | 3/2005 | Sagano et al. | 345/75.2 |
| 6,873,339 | B2 | | 3/2005 | Ohsawa et al. | 345/604 |
| 7,190,410 | B2 | | 3/2007 | Inamura | 348/656 |
| 7,483,011 | B2 | * | 1/2009 | Yang et al. | 345/88 |
| 2004/0257386 | A1 | | 12/2004 | Sagano et al. | 345/690 |
| 2005/0083341 | A1 | * | 4/2005 | Higgins et al. | 345/590 |
| 2005/0162572 | A1 | | 7/2005 | Ohsawa et al. | 348/745 |
| 2005/0185099 | A1 | | 8/2005 | Ohsawa et al. | 348/675 |
| 2005/0206958 | A1 | | 9/2005 | Inamura | 358/3.23 |
| 2006/0193604 | A1 | | 8/2006 | Hoshi et al. | 386/83 |

FOREIGN PATENT DOCUMENTS

| JP | 6-261332 | 9/1994 |
| JP | 2000-338950 | 12/2000 |
| JP | 2004-152737 | 5/2004 |

OTHER PUBLICATIONS

T. Ajito, et al., "Multi-primary color display system with diffractive optical element", *Collected Papers of Color Forum Japan 1997* (1997) pp. 13-16.

\* cited by examiner

*Primary Examiner*—M. Lee
(74) *Attorney, Agent, or Firm*—Fitzpatrick, Cella, Harper & Scinto

(57) ABSTRACT

A signal processing method comprises the steps of: inputting three signals specifying a color of one pixel; and generating four signals from the input three signals, wherein each of said four signals represents intensities of four different colors to display a color of one pixel by mixing colors, wherein said generating step includes a first converting step of converting the input three signals to two signals representing intensities of two colors among the four colors and a signal representing intensity of a mixed color obtained by mixing (a) the four colors or (b) a plurality of colors among the four colors; and a second converting step of converting the signal representing intensity of the mixed color to a plurality of signals representing intensities of a plurality of colors including at least other two colors different from the two colors.

18 Claims, 12 Drawing Sheets

SIGNAL PROCESSING METHOD, IMAGE DISPLAY APPARATUS, AND TELEVISION APPARATUS

BACKGROUND OF THE INVENTION

1. Field of the Invention

The present invention relates to a signal processing method of generating four signals representing intensities of four different colors to represent a color of one pixel from three signals designating a color of one pixel by mixing colors, an image display apparatus, and a Television apparatus.

2. Description of the Related Art

Conventionally, a display such as a TV set or a computer display monitor has displayed an image by using a light's three primary colors. In other words, various colors can be represented in such a manner that a pixel is composed of each sub pixel of Red (R), Green (G), and Blue (B) and the intensities of the lights of R, G, and B are changed using principles of a parasynthetic mixed color and an additive mixed color. The colors capable of being reproduced by this display is within a range that can be represented by a sum represented by a vector of three primary colors, R, G, and B.

FIG. 9 illustrates a color range, which can be reproduced by a display of three primary colors, by a three-dimensional vector. In an example shown in FIG. 9, as a coordinate space showing a position of R, G, and B on a three dimension, a CIE 1931 color coordinate system (an X, Y, and Z color coordinate system) is used. Then, a coordinate when R takes the highest value is defined as (XR, YR, ZR), a coordinate when G takes the highest value is defined as defined as (XG, YG, ZG), and a coordinate when B takes the highest value is defined as (XB, YB, ZB). In this case, the display can indicate the inside color of a hexahedron shown in FIG. 9.

In addition, only from the perspective of a chromaticity, a color reproduction range can be also represented by using an x and y chromaticity coordinate (an xy chromaticity diagram) of an X, Y, and Z color coordinate system. In this case, the color reproduction range is an area encircled by a triangle of FIG. 10.

In the display of three primitive colors, a color D having a coordinate of (XD, YD, and ZD) can be shown as "a mathematical expression 1" assuming that coefficients of the three primitive colors, R, G, and B are r, g, and b (the values of 0 to 1 are within an effective range, respectively).

$$\vec{D} = r \times \vec{R} + g \times \vec{G} + b \times \vec{B} \qquad \text{<Mathematical Expression 1>}$$

Where D, R, G, and B are vectors from original points (0, 0, and 0) into D, R, G, and B, respectively.

Transforming "Mathematical Expression 1" and representing it by a matrix calculation, "Mathematical Expression 2" is formed.

$$\begin{pmatrix} X_D \\ Y_D \\ Z_D \end{pmatrix} = M_3 \cdot \begin{pmatrix} r \\ g \\ b \end{pmatrix}, \qquad \text{<Mathematical Expression 2>}$$

$$M_3 = \begin{pmatrix} X_R & X_G & X_B \\ Y_R & Y_G & Y_B \\ Z_R & Z_G & Z_B \end{pmatrix}$$

Accordingly, the coefficients r, g, and b for representing the color D are obtained as shown in "Mathematical Expression 3".

$$\begin{pmatrix} r \\ g \\ b \end{pmatrix} = M_3^{-1} \cdot \begin{pmatrix} X_D \\ Y_D \\ Z_D \end{pmatrix} \qquad \text{<Mathematical Expression 3>}$$

In recent years, there has been an attempt to use four or more primary colors so as to broad the color reproduction range for this display of three primary colors. Thereby, a color that could not be represented by a conventional display can be reproduced and it is possible to improve color reproducibility and obtain a high realistic sensation.

In a display of n (n is an integer number of 3 or more) primary colors, the X, Y, and Z coordinate of (XD, YD, and ZD) of the display colors for the value of each primary color is obtained as shown in "Mathematical Expression 4".

$$\begin{pmatrix} X_D \\ Y_D \\ Z_D \end{pmatrix} = M_n \cdot \begin{pmatrix} c1 \\ c2 \\ c3 \\ \vdots \\ cn \end{pmatrix}, \qquad \text{<Mathematical Expression 4>}$$

$$M_n = \begin{pmatrix} X_{c1} & X_{c2} & X_{c3} & \cdots & X_{cn} \\ Y_{c1} & Y_{c2} & Y_{c3} & \cdots & Y_{cn} \\ Z_{c1} & Z_{c2} & Z_{c3} & \cdots & Z_{cn} \end{pmatrix}$$

Where c1, c2, c3, . . . , and cn are coefficients of respective primary colors, and (Xc1, Yc1, Zc1), (Xc2, Yc2, Zc2), . . . (Xcn, Ycn, Zcn) are X, Y, and Z coordinates of respective primary colors. In order to obtain a coefficient of each primary color from the X, Y, and Z values to be displayed, an inverse matrix of a matrix Mn should be calculated as shown in "Mathematical Expression 3". However, the matrix Mn is a matrix of 3×n, so that the inverse matrix thereof cannot be directly obtained.

Japanese Patent Application Laid-Open (JP-A.) No. 6-261332 discloses a method of displaying a color of a range, which could not be displayed by a conventional TV set of RGB three primary colors, by using six primary colors. According to a first example of JP-A. No. 6-261332, the transmitted image signal is converted into an RGB signal, and then, it is converted into an XY chromaticity coordinate so as to obtain the position where the XY chromaticity coordinate is located on the xy chromaticity diagram. When displaying colors, four combinations of three primary colors, which are not overlapped each other, are selected from among six primary colors in advance. This is shown by a chromaticity diagram as FIG. 11, and determining to which of four triangles the color to be displayed belongs, this color is displayed using three primary colors making an apex of the triangle, to which this color belongs.

In addition, as disclosed in JP-A. No. 2000-338950, there is a system of converting the inputted tristimulus value into a color image signal by providing means of determining in which area the color to be displayed is located in a three-dimensional color space capable of being displayed by four primary colors. In the case of four primary colors, a color within a three-dimensional figure as shown in FIG. 10A can be reproduced. In JP-A. No. 2000-338950, determining in which three-dimensional figure in FIGS. 10B to 10E the color to be displayed is included, the value of each primary color is obtained due to the same calculation as "Mathematical Expression 2" using the coordinate of the apex of the hexahedron encircling that color. This determination is carried out by calculating the coefficient of each primary color in FIGS. 12B to 12E using "Mathematical Expression 2" and checking whether all coefficients are covers by a range of 0 to 1 or not.

In JP-A. No. 2004-152737, as a method of converting the tristimulus value into a color image signal, a method of obtaining an inverse conversion of a 3×4 matrix by using a pseudo inverse matrix is exemplified.

In addition, in "collected papers of color forum JAPAN '97 (1997, PP. 13 to 16), a method is described, in which a ratio of coefficients of respective primary colors is calculated so that they have the highest luminance, which can be indicated by a display in the same xy chromaticity coordinate as that of the color to be displayed, to multiplex each coefficient with the value so as to obtain a desired luminance.

SUMMARY OF THE INVENTION

A general image signal specifies a color of a pixel by three signals. Specifically, an RGB signal specifies a color of one pixel by an R signal, a G signal, and a B signal. In addition, a YCrCb signal specifies a color of one pixel by a Y signal, a Cr signal, and a Cb signal A YIQ signal and a YUV signal specify a color of one pixel by three signals. Further, a XYZ signal known as a tristimulus value also specifies a color of one pixel by three signals, namely, a X signal, a Y signal, and a Z signal. In the present application, a set of three signals to specify a color of one pixel is referred to as a pixel signal. Three signals to compose one pixel signal are inputted in parallel or in serial each other. Each of three signals can be shaped in an analog signal or a digital signal. In the case of the digital signal, a digital signal of two or more bit numbers can be employed. Each bit of one signal having the two or more bit numbers can be inputted in serial or in parallel. Hereinafter, three signals for designating a color of one pixel are also referred to as three primary colors' signals. Further, in the present application, a color is not decided only by a chromaticity but it has a brightness as its attribution. In other words, even if the colors have the same chromaticities, they are different colors when they have different brightnesses.

In the conventional display of three primary colors, one pixel is composed of three sub-pixels of different colors, so that each signal level of three sub-pixels may be decided from the inputted three primary colors. In this case, the signal levels of three sub-pixels (the intensity of the color of each sub-pixel) can be uniquely decided depending on the inputted three primary signals. In the case of composing one pixel of four or more sub-pixels of different colors, it is not always true that a solution is uniquely decided upon calculation of a signal level of four or more sub-pixels from the inputted three primary colors' signals. The inventors of the present invention found that the existence of the unlighted sub-pixel might cause a visual interception in the display to obtain the image by composing a pixel arranging the sub-pixels corresponding to the different colors on a area. Then, they found that the visual interception could be prevented by lighting more sub-pixels within one pixel. In addition, in each of the sub-pixels, its property is changed in accordance with a history of its lighting. This may cause a difference of a property between a sub-pixel of which total lighting time is long and a sub-pixel of which lighting time is short (for example, a difference of a luminance when the same signal drives the sub-pixel). The inventors of the present invention found that the difference of the property between the sub-pixels are not caused easily in the long term by displaying a color designated by the inputted signal lighting more sub-pixels. Each sub-pixel is driven by a signal to specify an intensity of a color of the sub-pixel, so that it is possible to obtain an advantage that the visual interception is decreased by performing the signal processing, whereby the signal to designate the intensity of each color does not easily become 0, or an advantage that a property difference in the long term is prevented.

To achieve above-mentioned object, the present invention provides a signal processing method comprising the steps of:

inputting three signals specifying a color of one pixel; and generating four signals from the input three signals, wherein each of said four signals represents intensity of respective one of four different colors to display a color of one pixel by mixing colors, wherein said generating step includes a first converting step of converting the input three signals to two signals representing intensities of two colors among the four colors and a signal representing intensity of a mixed color obtained by mixing (a) the four colors or (b) a plurality of colors among the four colors; and a second converting step of converting the signal representing intensity of the mixed color to a plurality of signals representing intensities of a plurality of colors including at least other two colors different from the two colors.

DESCRIPTION OF THE EMBODIMENTS

Figure 1:
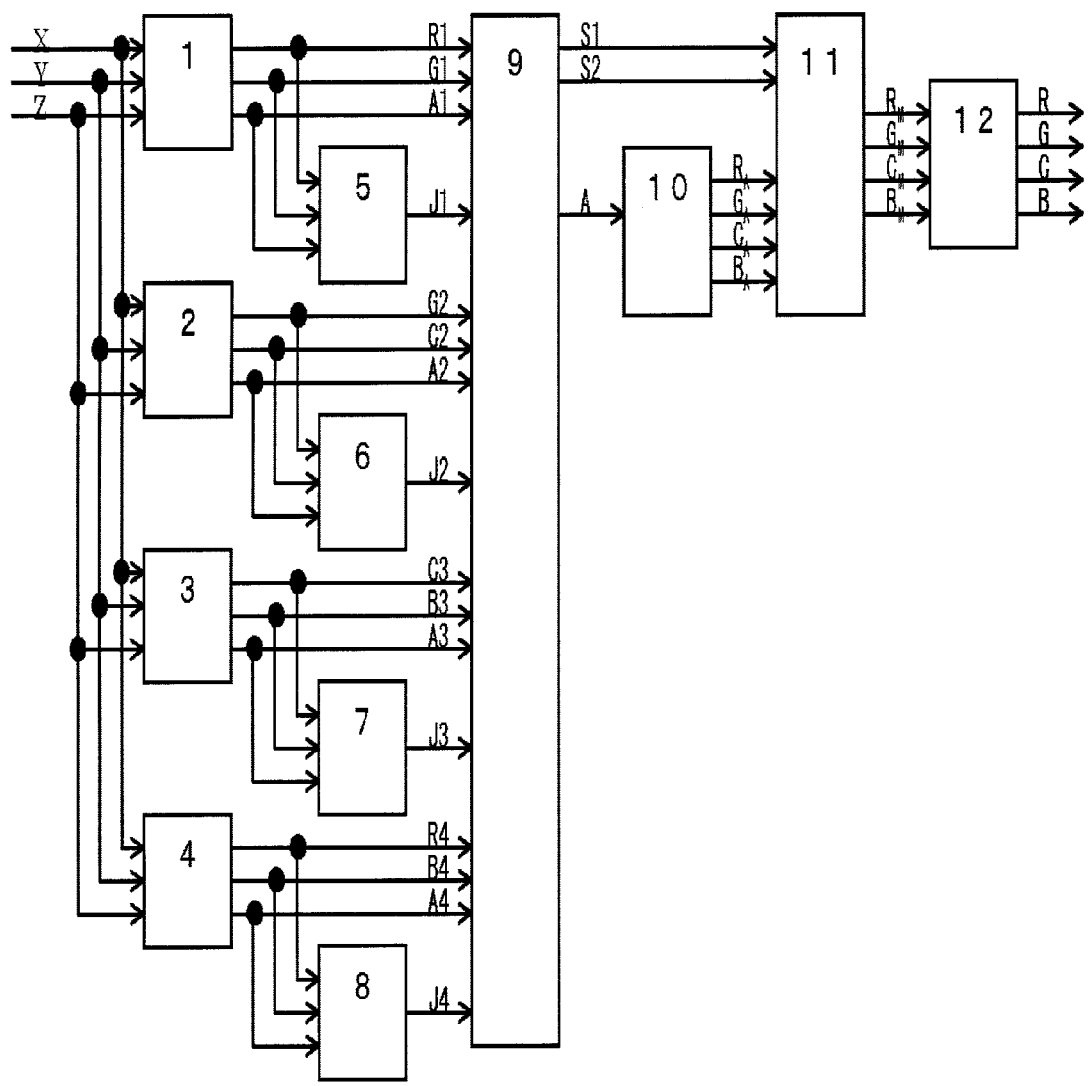
FIG. 1 illustrates a constitutional example of a hardware according to the present invention.

With reference to the drawings, the best mode for carrying out the invention will be described by way of illustration in detail below. However, the scope of the present invention is not only limited to the measurement, the material, the shape, and its relative position or the like of the components described in this embodiment unless otherwise specified. In addition, in the following descriptions, the same or corresponding elements are given the same reference numerals and marks.

(Embodiment of Television Apparatus)

Figure 8:
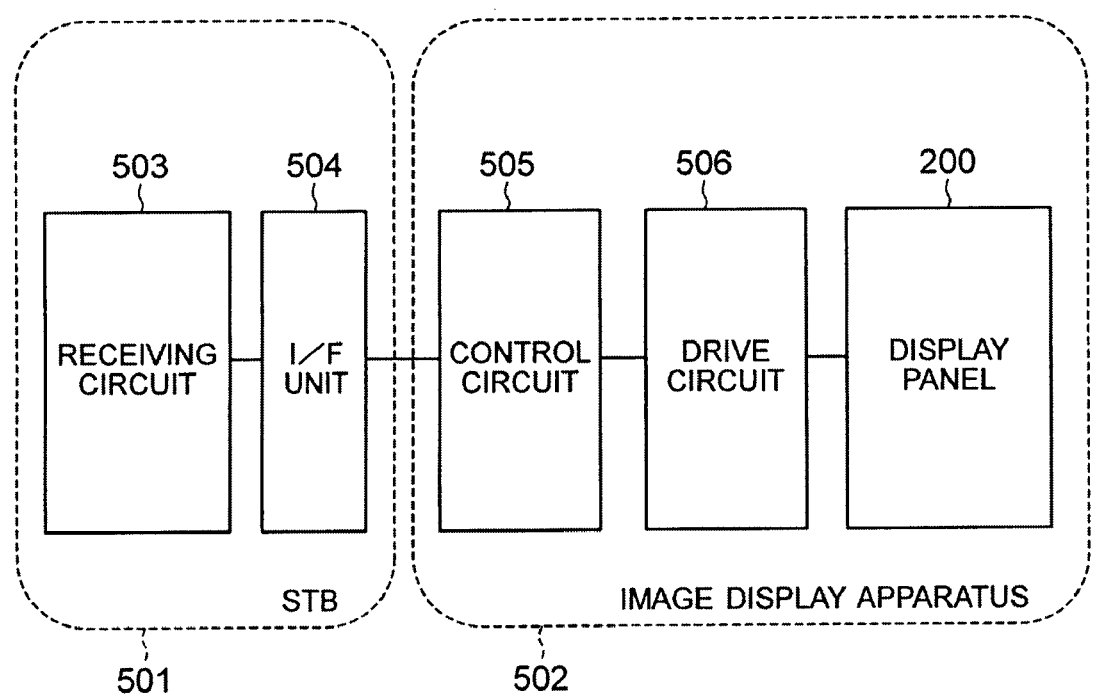
FIG. 8 is a block diagram of a TV apparatus according to the embodiment.
Figure 9:
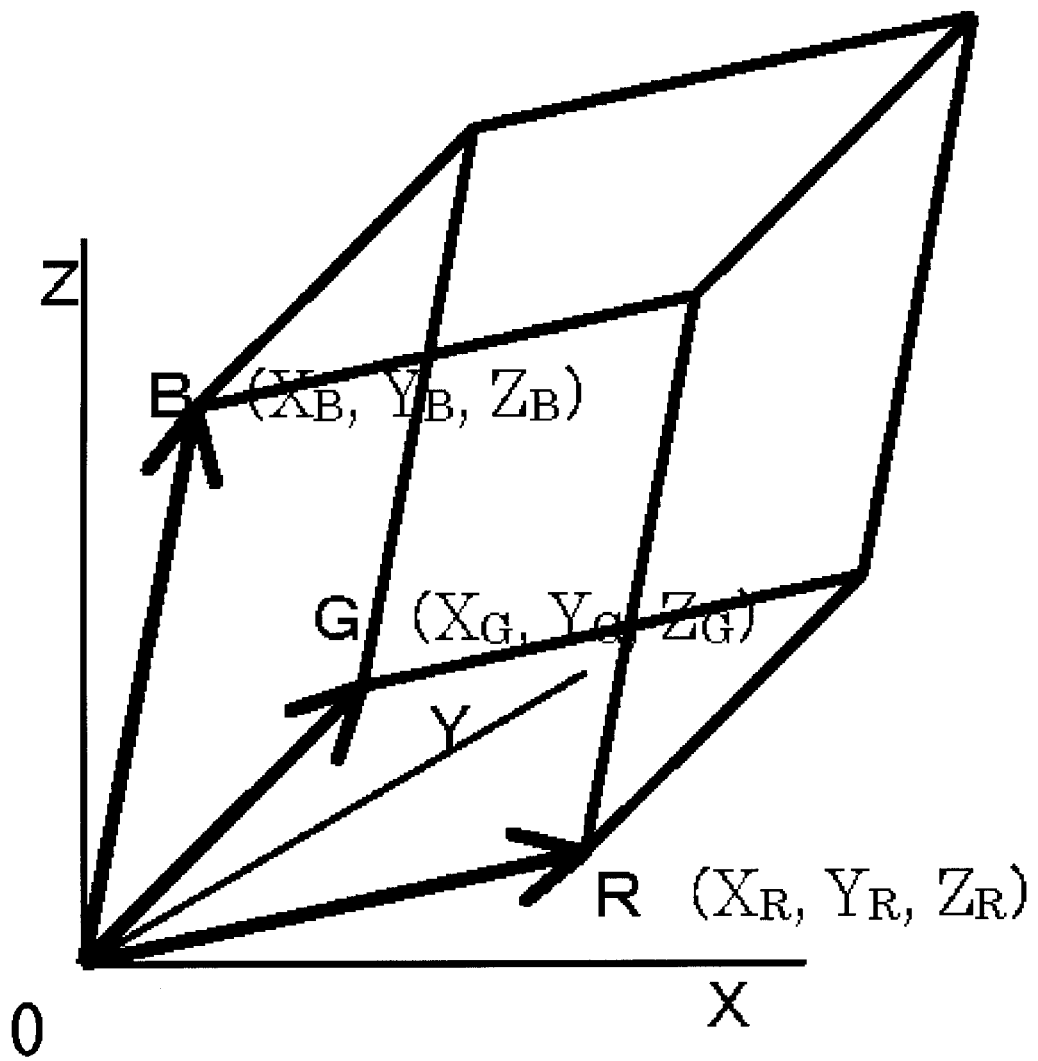
FIG. 9 is a view showing a color area of a display of three primary colors by a three-dimensional vector.
Figure 10:
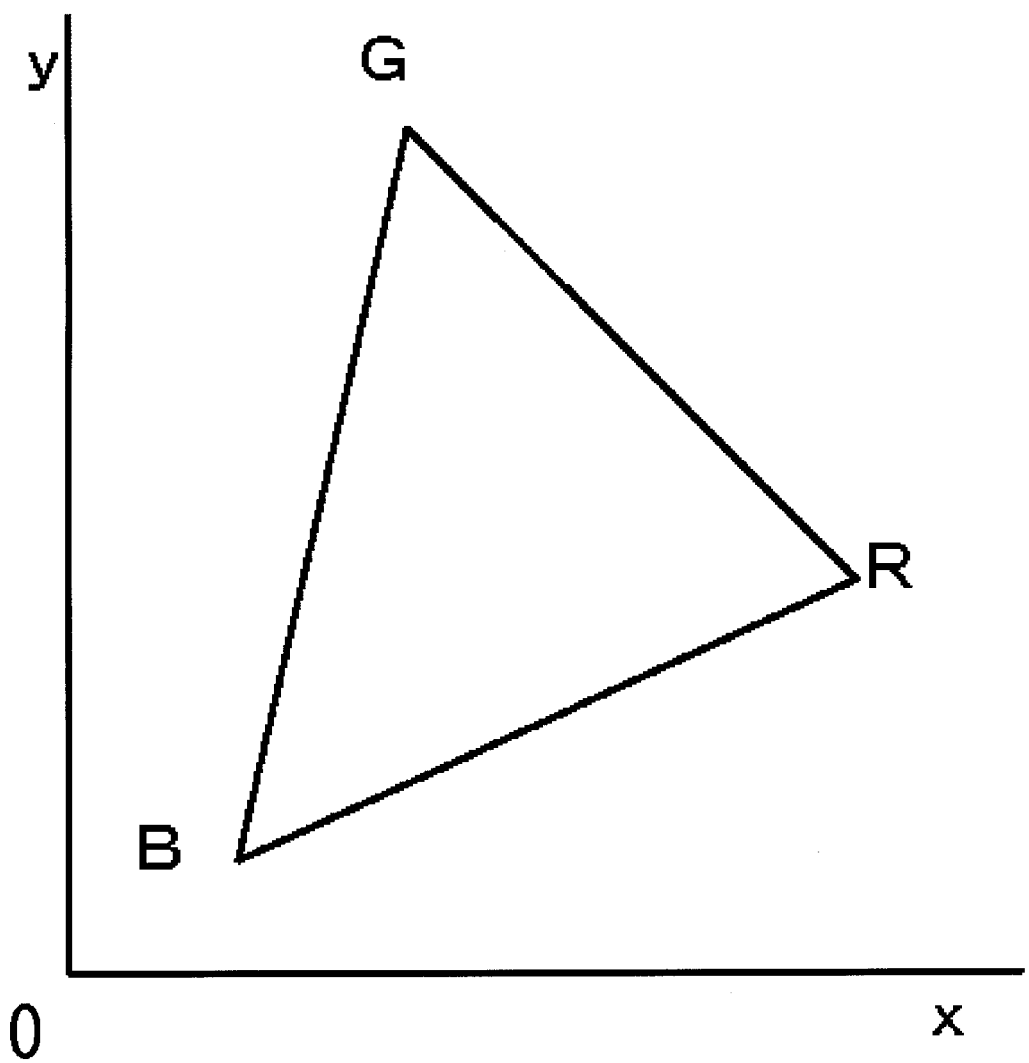
FIG. 10 is an xy chromaticity diagram representing a color area of a display of three primary colors by a three-dimensional vector.
Figure 11:
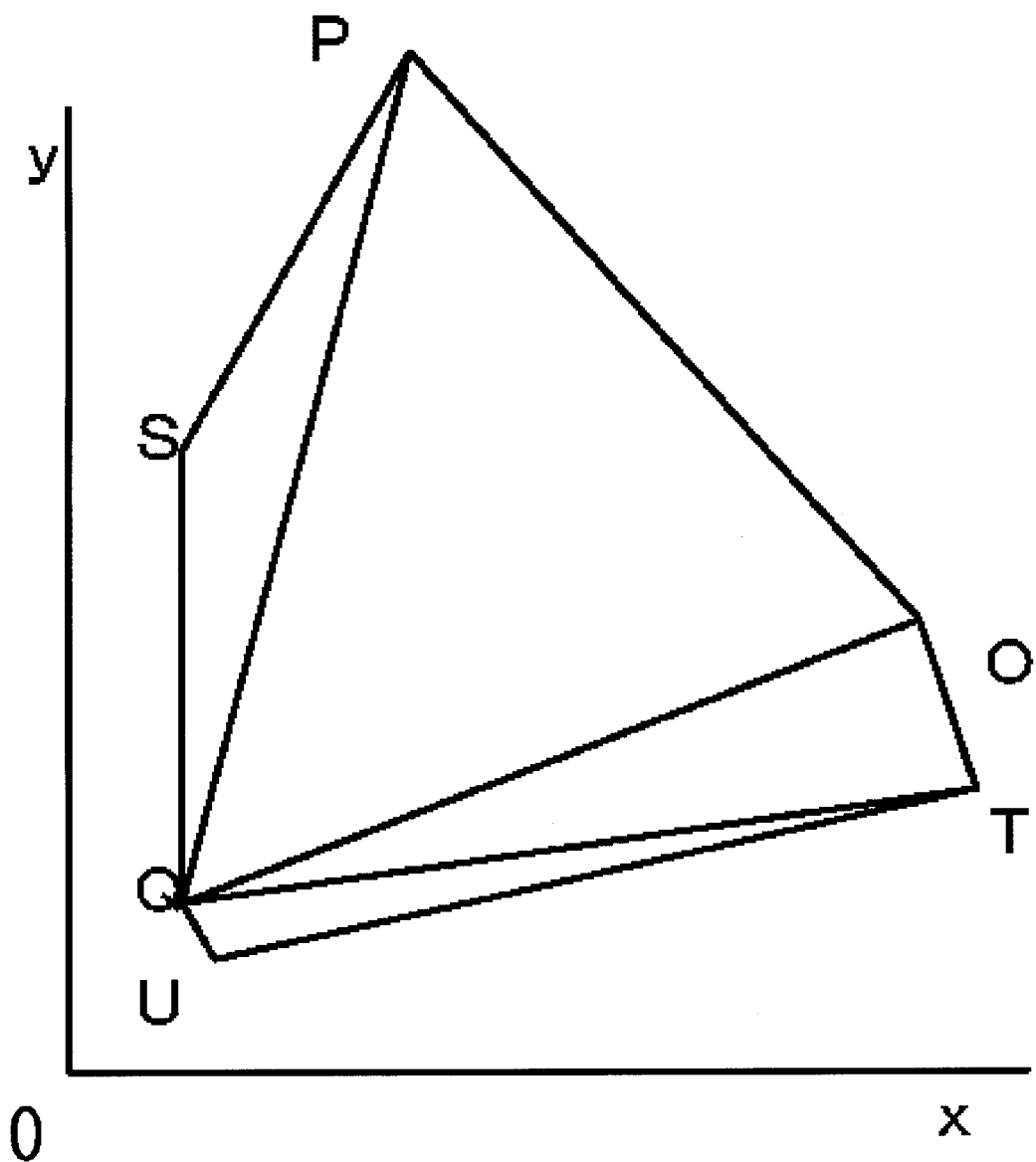
FIG. 11 is an xy chromaticity diagram representing a color area of a first example disclosed in JP-A No. 6-261332.
Figure 12A:
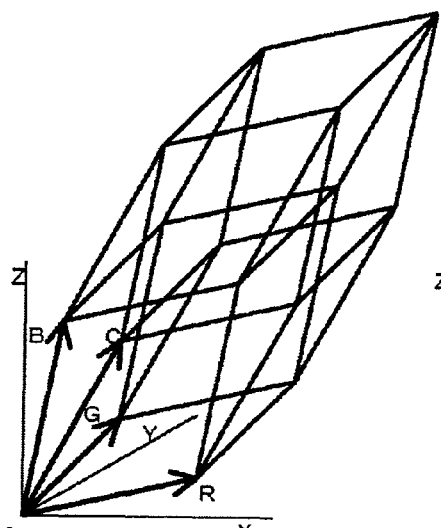
FIGS. 12A to 12E are views representing a color area of JP-A No. 2000-261332 by a three-dimensional vector.
Figure 12B:
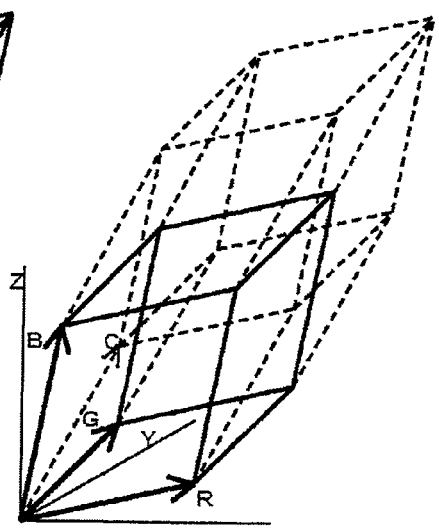
Figure 12C:
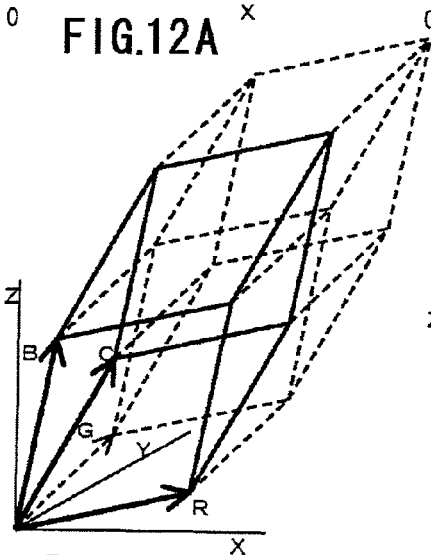
Figure 12D:
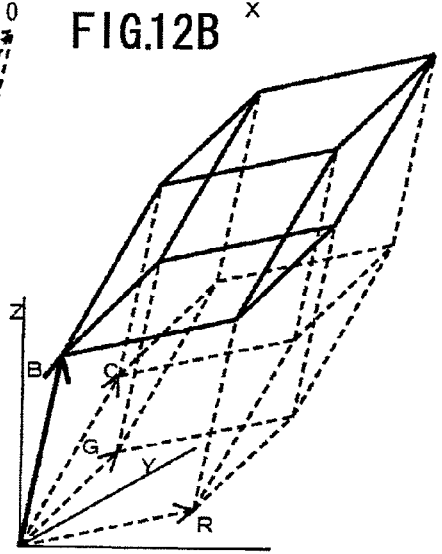
Figure 12E:
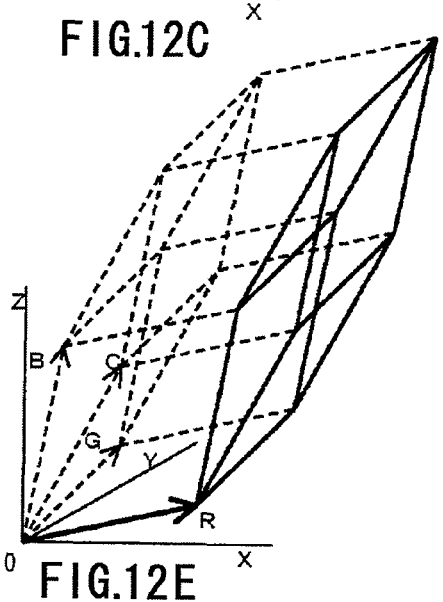

At first, with reference to FIG. 8, a TV apparatus, to which the present invention can be applied, will be described. FIG. 8 is a block diagram of a TV apparatus according to the invention. The TV apparatus is provided with a set top box (STB) 501 and an image display unit 502.

The set top box (STB) 501 has a receiving circuit 503 and an I/F part 504. The receiving circuit 503 is composed of a tuner and a decoder or the like and it receives a TV signal such as a satellite broadcast and a ground wave and a data broadcast via a network or the like and outputs decoded image data to the I/F part 504. The I/F part 504 converts the image data into a display format of the image display unit 502 to output the image data into the image display unit 502.

Figure 7:
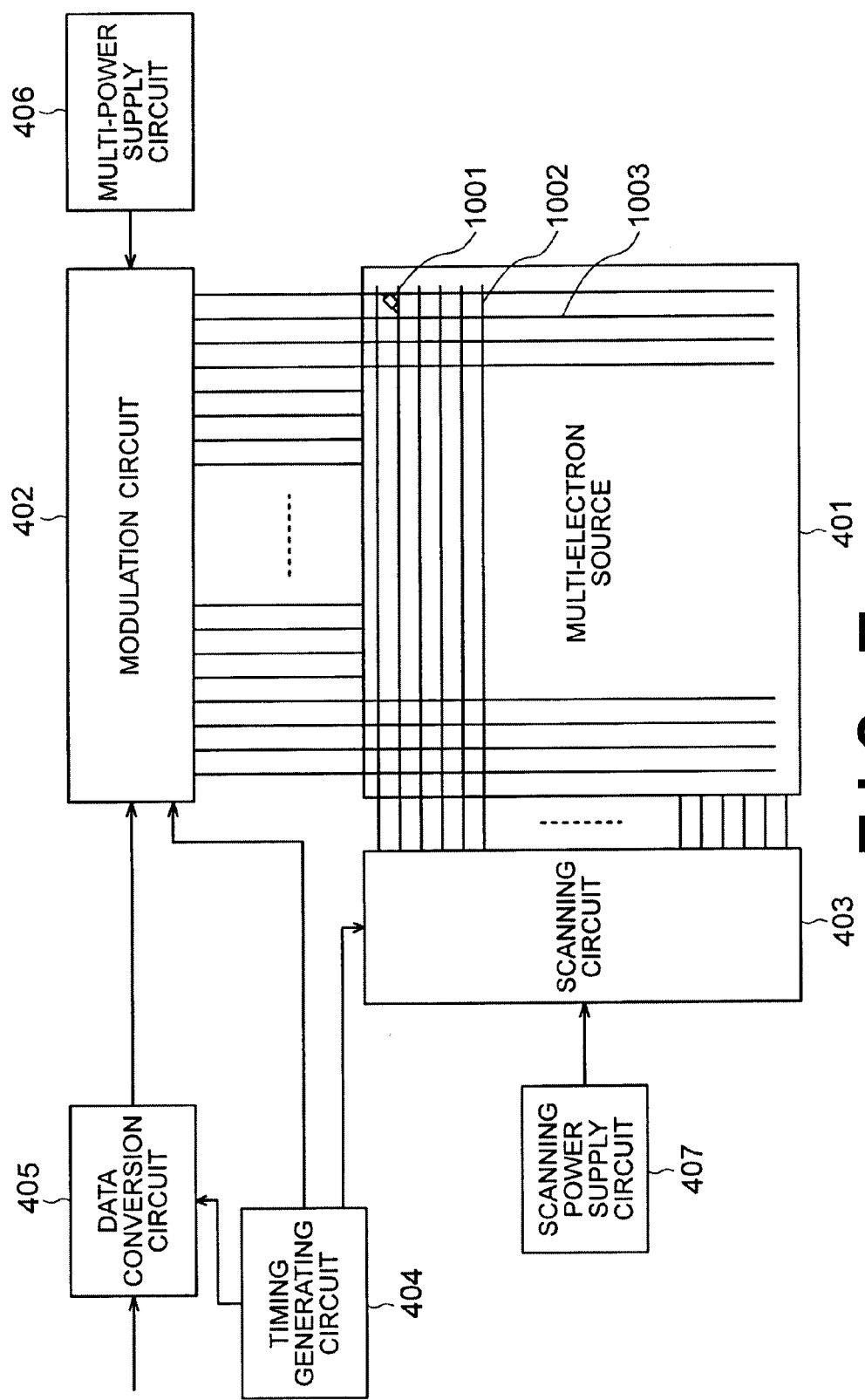
FIG. 7 is a block diagram of a data conversion circuit according to the embodiment.

The image display unit 502 has a display panel 200, a control circuit 505, and a driving circuit 506. The control circuit 505 included in the image display unit 502 applies the image processing such as correction appropriated for the image display 200 to the inputted image data and it outputs the image data and various control signals to the driving circuit 506. As an example of the control circuit 505, a timing generator circuit 404 in FIG. 7 may be considered. The driving circuit 506 outputs a driving signal to the display panel 200 on the basis of the inputted image data and this results in that a TV image is displayed on the display panel 200. As an example of the driving circuit 506, a modulation circuit 402 or a scanning circuit 403 in FIG. 7 may be considered. As an example of the display panel 200, as shown in FIG. 7, a multi electron source 401 may be considered in the following embodiment. As the multi electron source 401, for example, various display panels such as a FED, a PDP, a LCD display, a LED, and an EL display can be used.

Further, the receiving circuit 503 and the I/F part 504 may be stored as set top box (STB) 501 in a chassis other than that of the image display unit 502 or it may be stored in the same chassis as that of the image display unit 502.

As shown in FIG. 7, the driving circuit for driving the multi electron source 401 is configured by the modulation circuit 402, the scanning circuit 403, the timing generator circuit 404, a data conversion circuit 405, a multi electron source 406, and a scanning power source circuit 407. This driving circuit configures a part of an image displaying part in the image display unit.

The multi electron source 401 has a surface-conduction electron-emitter element 1001 as a display element. Here, a surface-conduction electron-emitter element is used as a display element, however, as a display element, various elements such as a Spindt-type electron emitter element and an electro luminescence electron can be used. In the case of using the electron-emitter element such as a surface-conduction electron-emitter element as a display element, a light is generated by irradiating an electron emitted by the electron-emitter element to a fluorescence body. Due to this light, the image is displayed. The brightness of the light can be controlled by the irradiation amount of the electron from the electron-emitter element within a predetermined time. The irradiation amount of the electron from the electron-emitter element can be controlled by a volume of a voltage to be applied to the electron-emitter element and a time width. Accordingly, a desired irradiation amount can be obtained by controlling a difference between a potential of a scanning signal and a potential of a modulation signal and an applied time of the modulation signal within a time frame for applying the scanning signal. According to the present embodiment, one pixel is composed of a red sub-pixel, a blue sub-pixel, a green sub-pixel, and a cyan sub-pixel. In addition, one sub-pixel in the present embodiment is composed of one or plural electron-emitter elements and a luminous body, which emits light in any color of red, green, blue, and cyan, when the electron is irradiated from these electron-emitter elements.

The multi electron source 401 has a plurality of scanning wires 1002 and a plurality of modulation wirings 1003, which connect a plurality of display elements so as to be driven by a matrix. The scanning signals are applied to these scanning wires 1002, and the modulation signals are applied to the modulation wirings 1003.

The modulation circuit 402 is a circuit to generate a modulation signal in accordance with the inputted modulation data. The modulation circuit 402 functions as modulation means to give a modulation signal modulated on the basis of the modulation data inputted form the data conversion circuit 405 to column-wise wirings to be connected to a plurality of electron sources, respectively.

The scanning circuit 403 is connected in row-wise wirings of the multi electron source 401 and serves as a circuit to supply a selection signal (a scanning signal) to a scanning wiring, to which a display element to be driven by the output of the modulation circuit 402 is connected. Generally, a linear sequential scanning to sequentially select a row one by one is carried out, however, the present embodiment is not limited to this but a interlaced scanning, selection of plural rows, and a selection of a area are also possible. In other words, the scanning circuit 403 functions as selection means to give a selected potential to the row-wise wirings to which a plurality of electron sources to be driven from among a plurality of electron sources included in the multi electron source 401 for a predetermined time, give an unselected potential for other time, and select a row.

The timing generator circuit 404 is a circuit to generate a timing signal of the modulation circuit 402, the scanning circuit 403, and the data conversion circuit 405.

The data conversion circuit 405 is a circuit to convert the inputted three primary colors' signals into four primary colors' signals. The four primary colors' signals are a set of four signals to specify intensities of four different colors in order to display a color of one pixel by mixing colors. Due to these four signals, the driven states of the sub-pixels of the four different colors are specified. According to the present embodiment, the intensity of the color is equivalent to the intensity of emission of light in that color. The intensity of emission of light can be controlled by the size of a wave high value of a driven waveform to be applied to the display element and a duration time of the driven waveform. In addition, the data conversion circuit 405 is a circuit, which performs data conversion to convert the gradation data (luminance data) showing brightness required of the multi electron source 401 from the outside into a driven waveform data format appropriated for the modulation circuit 402.

First Embodiment

In the display using the present embodiment, one pixel is composed of four colors (four sub-pixels) which are different from each other. Here, respective colors are R (red), G (green), C (cyan) and B (blue). However, each color of the sub-pixel is not limited to a combination of these colors. Hereinafter, each color of the sub-pixels is referred to as a primary color. In a XYZ chromaticity coordinate at the highest lighting of each primary color, R is defined as (XR, YR, ZR), G is defined as (XG, YG, ZG), C is defined as (XC, YC, ZC), and B is defined as (XB, YB, ZB). A mixed color obtained by synthesizing four primary colors in a mixture ratio (k, l, m, n) is defined as A (XA, YA, ZA) and the mixed color is defined by "Mathematical Expression 5" (corresponding to "a linear type combination" of the present invention). A mixed color A is converted into a plurality of primary colors by "Mathematical Expression 10". Therefore, it is preferable that the mixed color A is a color obtained by mixing all of four primary colors. In other words, the mixture ration is preferably 0<k, l, m, n≦1.

The mixture ratio may be set on a table as a predetermined mixture ratio obtaining a value for best viewing in advance, or a combination of plural coefficients may be set on a table so that the mixture ration can be dynamically changed depending on the size of each component of the inputted three primary colors' signals. In addition, it is preferable that the mixture ratio is set so that the luminance difference of each pixel is reduced.

$$\begin{cases} A = k \times R + l \times G + m \times C + n \times B \\ X_A = k \times X_R + l \times X_G + m \times X_C + n \times X_B \\ Y_A = k \times Y_R + l \times Y_G + m \times Y_C + n \times Y_B \\ Z_A = k \times Z_R + l \times Z_G + m \times Z_C + n \times Z_B \end{cases} \quad \text{<Mathematical Expression 5>}$$

Figure 4:
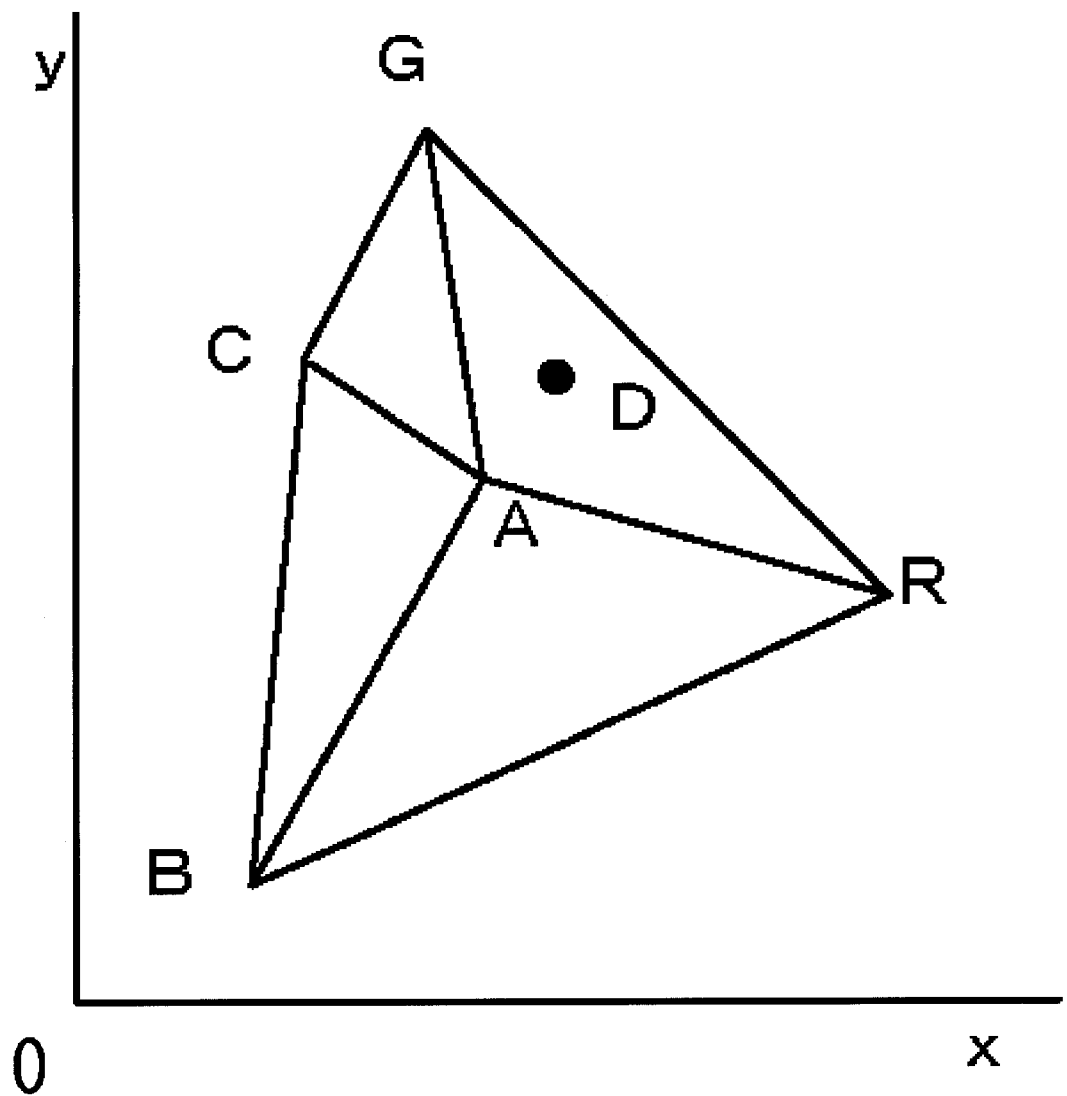
FIG. 4 is an xy chromaticity diagram representing an xy chromaticity coordinate of a first embodiment.

FIG. 4 shows four primary colors R, G, C, and B and a mixed color A according to the present embodiment by an xy chromaticity diagram. In FIG. 4, an area encircled by a square RGCB is a color area of a display. In this case, an xy chromaticity coordinate of the mixed color A is located within a color area of the display.

It is assumed that a user wishes to convert an arbitrary color D (XD, YD, ZD) indicated by the inputted three primary colors' signals into a color D (four primary colors R, G, C, and B) indicated by the four primary colors' signals to be represented by four primary colors.

At first, with respect to each of four combinations of two primary colors among four primary colors and the mixed color A (RGA, GCA, CBA, and RBA) the matrix calculation is made to obtain the coefficients of two primary colors and the coefficient of the mixed A for representing the color D by three colors (mathematical expressions 6 to 9). A step of obtaining the coefficients of these two primary colors and the mixed color is equivalent to a first conversion step according to the present invention. The coefficient of the mixed color A can be obtained in the all of four combinations.

$$\begin{pmatrix} r_{11} \\ g_{11} \\ a_{11} \end{pmatrix} = \begin{pmatrix} X_R & X_G & X_A \\ Y_R & Y_G & Y_A \\ Z_R & Z_G & Z_A \end{pmatrix}^{-1} \cdot \begin{pmatrix} X_D \\ Y_D \\ Z_D \end{pmatrix} \quad \text{< Mathematical Expression 6 >}$$

$$\begin{pmatrix} g_{12} \\ c_{12} \\ a_{12} \end{pmatrix} = \begin{pmatrix} X_G & X_C & X_A \\ Y_G & Y_C & Y_A \\ Z_G & Z_C & Z_A \end{pmatrix}^{-1} \cdot \begin{pmatrix} X_D \\ Y_D \\ Z_D \end{pmatrix} \quad \text{< Mathematical Expression 7 >}$$

$$\begin{pmatrix} c_{13} \\ b_{13} \\ a_{13} \end{pmatrix} = \begin{pmatrix} X_C & X_B & X_A \\ Y_C & Y_B & Y_A \\ Z_C & Z_B & Z_A \end{pmatrix}^{-1} \cdot \begin{pmatrix} X_D \\ Y_D \\ Z_D \end{pmatrix} \quad \text{< Mathematical Expression 8 >}$$

$$\begin{pmatrix} r_{14} \\ b_{14} \\ a_{14} \end{pmatrix} = \begin{pmatrix} X_R & X_B & X_A \\ Y_R & Y_B & Y_A \\ Z_R & Z_B & Z_A \end{pmatrix}^{-1} \cdot \begin{pmatrix} X_D \\ Y_D \\ Z_D \end{pmatrix} \quad \text{< Mathematical Expression 9 >}$$

Where coefficients r11, g11, and a11 are the coefficients of two primary colors R and G and the coefficient of the mixed color A, respectively. Specifically, r11 denotes a signal indicating the intensity of red, g11 denotes a signal indicating the intensity of green, and a11 denotes a signal indicating the intensity of the mixed color having four primary colors mixed therein. In FIG. 4, the color D is included in the area RGA. Coefficients g12, c12, and a12 are the coefficients of two primary colors G and C and the coefficient of the mixed color A, coefficients c13, b13, and a13 are the coefficients of two primary colors C and B and the coefficient of the mixed color A, and coefficients r14, b14, and a14 are the coefficients of two primary colors R and B and the coefficient of the mixed color A, respectively. When the value of the coefficient of each primary color is zero, the light of this primary color is turned off and the highest luminance intensity is represented when the value is 1. Here, assuming that the value of each coefficient takes a value within the range from 0 to 1; however, it is preferable that the signals are processed by a digital signal. For example, it is preferable that the signals are processed by a digital signal of the bit number of 8 bits or more, namely, a signal to take a value of the range from 0 to 255 or more in a binary digit.

It is assumed that the color D to be displayed is located at the xy position shown in FIG. 4 (the inside of the triangle RGA on the xy chromaticity diagram). In this case, all of the coefficients r11, g11, and a11 of "Mathematical Expression 6" representing the color D by two primary colors R and G and the mixed color A are positive. In other combinations, the value of any coefficient is negative. The fact that all of the coefficients of two primary colors and the coefficient of the mixed color A are positive values indicates that the color D can be represented by these tree colors. Therefore, this combination is selected.

The mixed color A can be represented by four primary colors R, G, C, and B as shown in "Mathematical Expression 5". In other words, the coefficients rA, gA, cA, and bA of four primary colors R, G, C, and B for displaying the mixed color A by a positive coefficient all are as shown by "Mathematical Expression 10". In "Mathematical Expression 10", the mixed color is converted into four primary colors (a signal representing the intensities of four colors composing the mixed color) in accordance with the mixture ratio. This conversion is equivalent to a second conversion step according to the present invention. Since a signal indicating the intensities of a color C and a color B among the signals indicating the intensities of four colors obtained by this second conversion step is not obtained in the first conversion step, it is not necessary to synthesize this signal with the signal obtained in the first conversion step. Accordingly, it is possible to output the signal obtained in the second conversion step to a rear stage as it is. However, since a significant signal is also obtained in the first conversion step with respect to a color R and a color G among four signals obtained in the second conversion step, a signal obtained in the first conversion step is synthesized with a signal obtained in the second conversion step. This synthesis can be simply realized by addition. However, this is not limited to a simple addition. For example, in the configuration that a predetermined calculation is further made with respect to four signals, the signals of the additional target may be added by making the predetermined calculation in advance. As described above, it is possible to obtain the coefficients rD, gD, cD, and bD of four primary colors R, G, C, and B for displaying the target color D (Mathematical Expression 11). Here, even if the coefficients k and l of rA and gA in Mathematical Expression 10 are zero, it is possible to obtain the coefficients rD, gD, cD, and bD of four primary colors R, G, C, and B shown in Mathematical Expression 11. In other words, the mixed color may be a color obtained by mixing at least two primary colors among four primary colors. For example, if a color on a line connecting the color C and the color B on the chromaticity diagram of FIG. 4 is used as the mixed color A, the mixed color A is divided only into the color C and the color B. Accordingly, without carrying out the synthesizing step, it is possible to use the signals of the color R and the color G obtained in the first conversion step and the signals of the color C and the color B obtained in the second conversion step as four signals to indicate the intensities of four colors for displaying a color of one pixel by the mixed color. Further, there is a method to use the sizes of components of the inputted three primary colors' signals as a method to select the combination of the coefficients including any coefficient of zero. For example, when the size of the component of any among the inputted three primary colors' signals exceeds a predetermined value (for example, a predetermined value "192" from the lowest value "0" to the highest value "255")), the combination of the coefficients having the coefficient of the component exceeding the predetermined value is zero may be selected from the table.

$$\begin{cases} r_A = k \times a_{11} \\ g_A = l \times a_{11} \\ c_A = m \times a_{11} \\ b_A = n \times a_{11} \end{cases} \quad \text{< Mathematical Expression 10 >}$$

$$\begin{cases} r_D = r_{11} + r_A = r_{11} + k \times a_{11} \\ g_D = g_{11} + g_A = g_{11} + l \times a_{11} \\ c_D = c_A \\ b_D = b_A \end{cases} \quad \text{< Mathematical Expression 11 >}$$

When the color D belongs to other area, selecting the combination that the coefficients of two primary colors capable of displaying the color D and the coefficient of the mixed color A are the positive values and making the calculation in the same way, it is possible to obtain the coefficients of four primary colors.

According to the present embodiment, three primary colors' signals are converted into three colors including the mixed color when converting three primary colors' signals into four primary colors' signals represented by four primary colors, so that the calculation of the coefficient is simple. In other words, a solution can be easily obtained when the number of signals to be inputted is the same as the number of signals to be obtained in one conversion step. Further, if the inverse matrix is stored in a memory or the like in advance, in the calculation of the coefficients shown in Mathematical Expressions 6 to 10, addition and multiplication may be only made. In addition, the coefficients of four primary colors are the positive values unless the colors are located at the furthest outline. As a result, since each signal component representing four primary colors of four primary colors' signals becomes positive, all of four sub-pixels can be lighted.

Second Embodiment

The example of the display according to the present embodiment that one pixel is composed of four primary colors, R, G, C, and B will be described below. It is assumed that R is (XR, YR, ZR), G is (XG, YG, ZG), C is (XC, YC, ZC) and B is (XB, YB, ZB) in the XYZ chromaticity coordinate.

Figure 5:
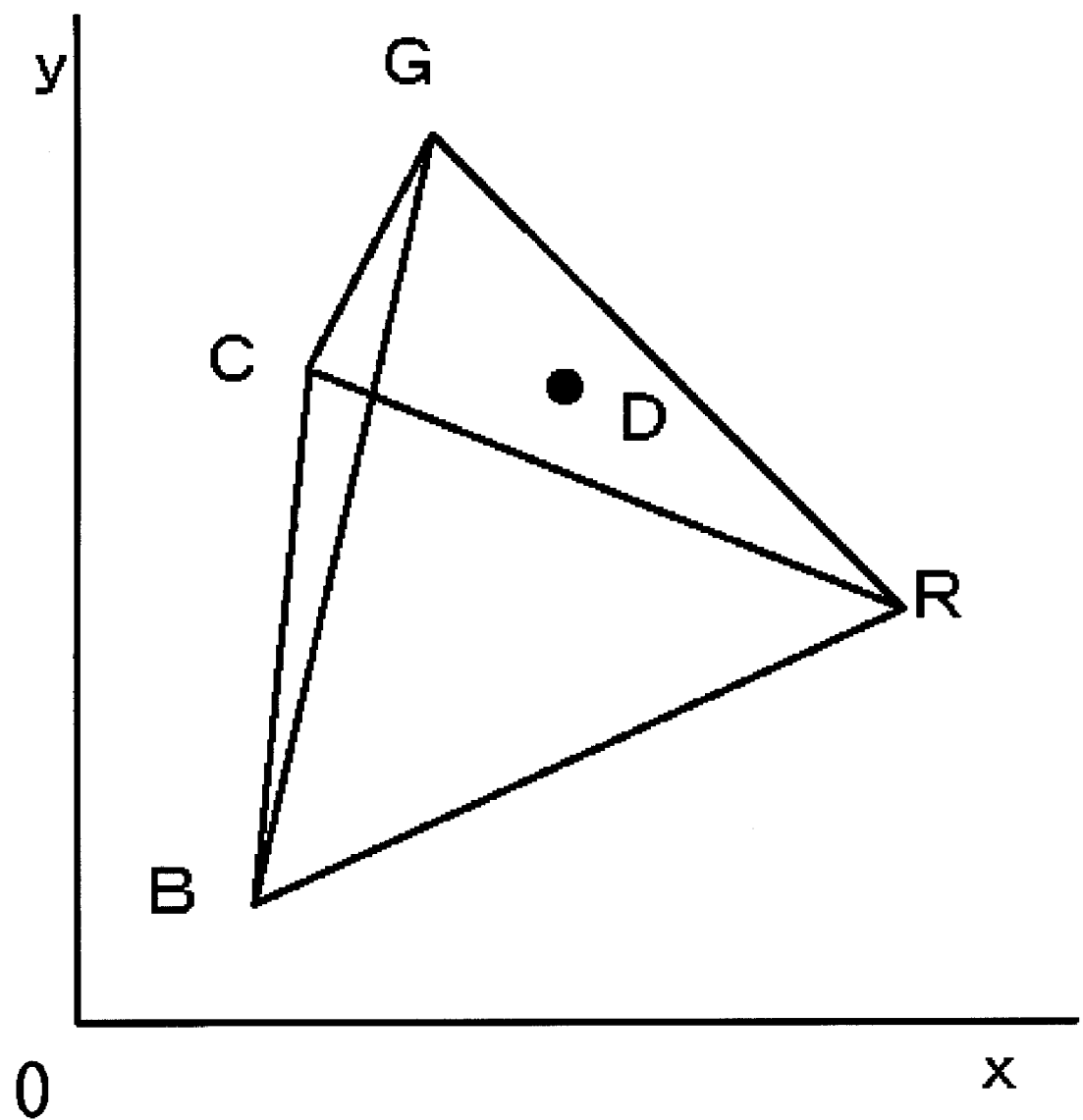
FIG. 5 is an xy chromaticity diagram representing an xy chromaticity coordinate of a second embodiment.
Figure 6A:
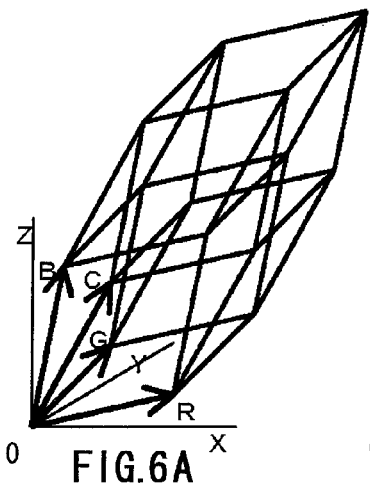
FIGS. 6A to 6I are views showing a color area of a fourth embodiment by a three-dimensional vector.
Figure 6B:
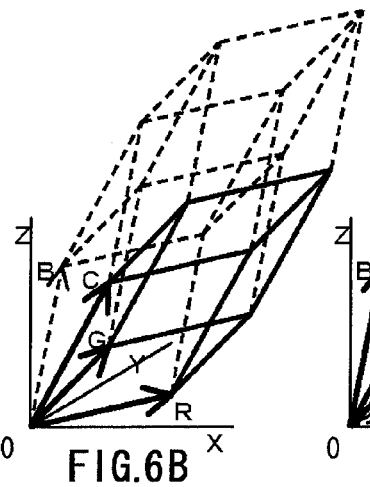
Figure 6C:
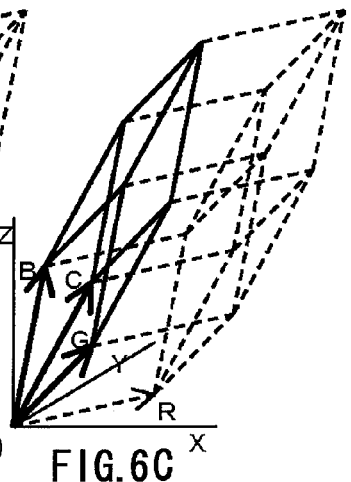
Figure 6D:
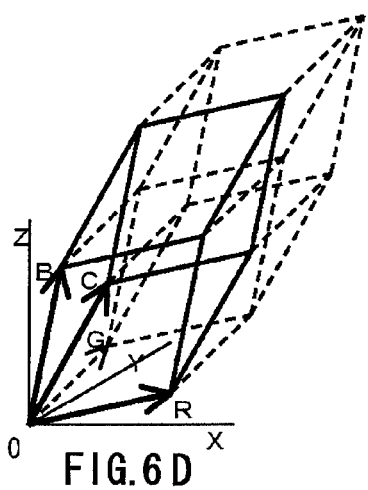
Figure 6E:
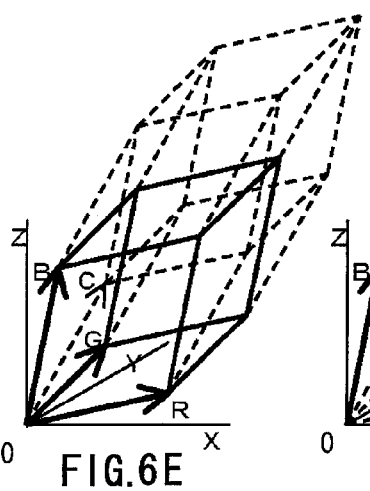
Figure 6F:
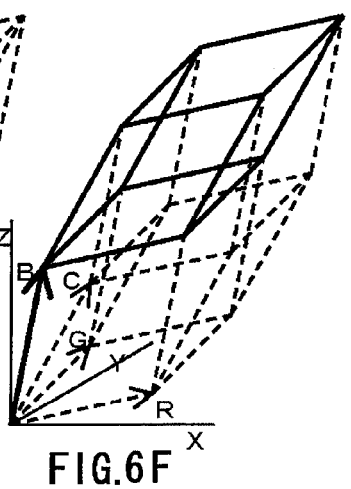
Figure 6G:
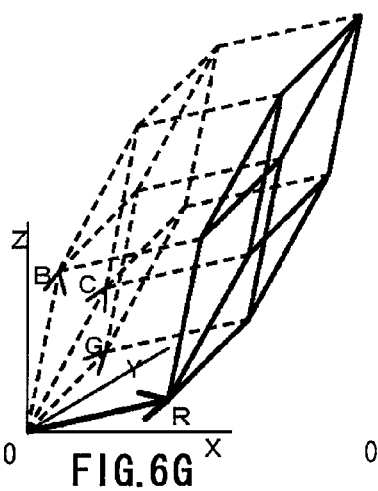
Figure 6H:
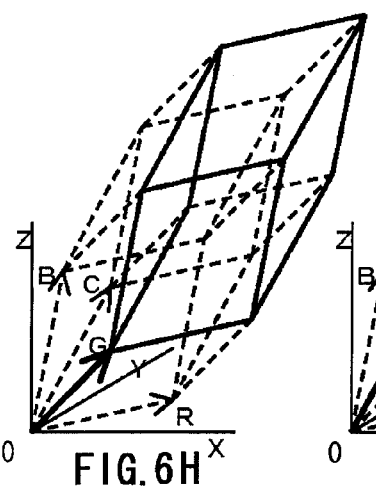
Figure 6I:
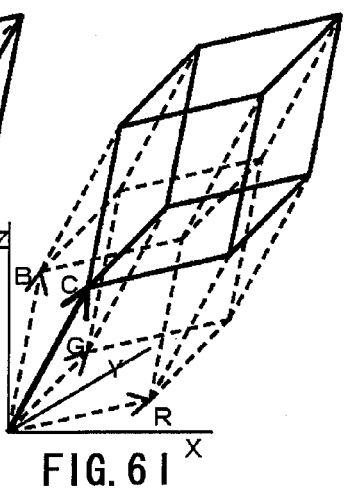

Here, in the case of displaying an arbitrary color D in the XYZ chromaticity coordinate (XD, YD, ZD) using four primary colors, the matrix calculation will be made with respect to the all combinations of three primary colors in four primary colors, namely, (RGC, GCB, RCB, RGB). With respect to each of four combinations, three coefficients for displaying the color D by three primary colors are obtained (Mathematical Expressions 12 to 15). Thereby, four combinations of the different three primary colors can be obtained.

$$\begin{pmatrix} r_{21} \\ g_{21} \\ c_{21} \end{pmatrix} = \begin{pmatrix} X_R & X_G & X_C \\ Y_R & Y_G & Y_C \\ Z_R & Z_G & Z_C \end{pmatrix}^{-1} \cdot \begin{pmatrix} X_D \\ Y_D \\ Z_D \end{pmatrix} \quad \text{< Mathematical Expression 12 >}$$

$$\begin{pmatrix} g_{22} \\ c_{22} \\ b_{22} \end{pmatrix} = \begin{pmatrix} X_G & X_C & X_B \\ Y_G & Y_C & Y_B \\ Z_G & Z_C & Z_B \end{pmatrix}^{-1} \cdot \begin{pmatrix} X_D \\ Y_D \\ Z_D \end{pmatrix} \quad \text{< Mathematical Expression 13 >}$$

$$\begin{pmatrix} r_{23} \\ c_{23} \\ b_{23} \end{pmatrix} = \begin{pmatrix} X_R & X_C & X_B \\ Y_R & Y_C & Y_B \\ Z_R & Z_C & Z_B \end{pmatrix}^{-1} \cdot \begin{pmatrix} X_D \\ Y_D \\ Z_D \end{pmatrix} \quad \text{< Mathematical Expression 14 >}$$

$$\begin{pmatrix} r_{24} \\ g_{24} \\ b_{24} \end{pmatrix} = \begin{pmatrix} X_R & X_G & X_B \\ Y_R & Y_G & Y_B \\ Z_R & Z_G & Z_B \end{pmatrix}^{-1} \cdot \begin{pmatrix} X_D \\ Y_D \\ Z_D \end{pmatrix} \quad \text{< Mathematical Expression 15 >}$$

Where the coefficients r21, g21, and c21 are the coefficients of three primary colors, R, G, and C, respectively. The coefficients r24, g24, and b24 are the coefficients of three primary colors, R, G, and B, respectively. In FIG. 5, the color D is included in the area RGC and the area RGB. The coefficients g22, c22, b22 and the coefficients r23, c23, b23 are the coefficients of three primary colors R, G, and C and three primary colors R, C, and B, respectively. When the value of the coefficient of each primary color is "zero", the primary color is turned off and when the value thereof is 1, the primary color represents the highest luminance intensity of emission of light.

When the color D to be displayed is located at the xy position shown in FIG. 5, the xy chromaticity coordinate of the color D is located insides of the area RGC and the area RGB on the chromaticity diagram. In other words, each of the coefficients r21, g21, and c21 of "Mathematical Expression 12" showing the color D by three primary colors R, G, and C takes a positive value and each of the coefficients r24, g24, and b24 of "Mathematical Expression 15" showing the color D by three primary colors R, G, and B takes a positive value. In other combination, the value of any coefficient takes a negative value. The fact that all of three primary colors take positive values means that the color D can be displayed by these three colors and such a combination will be selected.

So, two combinations having the all coefficients displaying the color D of positive values will be selected from among four combinations (Mathematical Expressions 12 to 15) for displaying the color D.

The coefficients rD, gD, cD, and bD of four primary colors R, G, C, and B for displaying the target color D will be obtained by weighting average (synthesizing) the value of the coefficient of each of three primary colors R, G, and C and three primary colors R, G, and B of the selected two combinations (Mathematical Expression 16).

So, by weighting and averaging these values as shown in Mathematical Expression 16 using six coefficients relating to the selected two combinations, the coefficients rD, gD, cD, and bD of four primary colors R, G, C, and B can be synthesized while preventing the chromaticity of each of the selected two combinations from being largely changed. As a result, the inputted three primary colors' signals can be converted into four primary colors' signals without largely change of the chromaticity of the selected two combinations before and after conversion. In other words, respective three primary colors' signals of two combinations displaying the same color D can be synthesized while maintaining the chromaticity.

$$\begin{cases} r_D = s \times r_{21} + t \times r_{24} \\ g_D = s \times g_{21} + t \times g_{24} \\ c_D = s \times c_{21} \\ b_D = t \times b_{24} \\ s + t = 1 (s \cdot t > 0) \end{cases} \quad \text{<Mathematical Expression 16>}$$

In addition, when the color D is located in other area, selecting two combinations that all of three primary colors have positive values, the coefficient of each primary color may be weighted and averaged. In addition to weighting average, arithmetic average, weighting arithmetic average, geometric average, or weighting geometric average may be utilized in order to maintain the chromaticity and synthesize three primary colors (predetermined synthesize processing).

The range for "maintaining a chromaticity" according to the present embodiment is a range where a human being does not recognize change of a color visually. Specifically, defining the range for "maintaining a chromaticity" by a color difference of a u'v' chromaticity calculated from the xy chromaticity, this range is preferably a range of "Δu'v'<=0.015" (the range for substantially maintaining the chromaticity).

u' and v' will be obtained from XYZ tristimulus value as follows:

Namely, $u'=4X/(X+15Y+3Z)$ $v'=9Y/(X+15Y+3Z)$

Or, from an xy chromaticity coordinate, $u'=4X/(-2X+12Y+3)$ $v'=9Y/(-2X+12Y+3)$

Here, assuming that a chromaticity when a pixel is displayed by three signals obtained in one combination among the prior two combinations is (u'1, v'1); a chromaticity when a pixel is displayed by three signals obtained in another combination among the two combinations is (u'2, v'2); and a chromaticity when a pixel is displayed by four signals obtained as a result of synthesis is (u', v'), Δu'v'={(u'-u'1) 2+(v'-v'1) 2}(½) and Δu'v'={(u'-u'2) 2+(v'-v'2) 2}(½) are obtained.

Any of these equations may show the value not more than 0.015.

Specifically, this requirement can be easily attained when s=t=½ is established in "Mathematical Expression 16".

According to the present embodiment, in the case of converting three primary colors' signals into four primary colors' signals represented by four primary colors, three primary colors of three primary colors' signals are converted into three primary colors among four primary colors, so that calculation of a coefficient is simple. In addition, if an inverse matrix is stored in a memory or the like in advance, in the calculation of the coefficients shown in Mathematical Expressions 12 to 15, only addition and multiplication may be carried out. Further, by synthesizing six positive coefficients about two combinations of three primary colors, the coefficients of four primary colors' R, G, C, and B can be obtained. Thereby, the coefficients of four primary colors are the positive values unless the colors are located at the furthest outline. As a result, since each signal component representing four primary colors of four primary colors' signals becomes positive, all of four sub-pixels composing one pixel can be lighted.

Third Embodiment

According to the first and second embodiments, the coefficient of any of four primary colors R, G, C, and B may exceed 1 depending on the value of the mixed color A and the value of the color D. In this case, seeking a difference between 1 and the value of the coefficient exceeding 1 and representing the difference by other primary color, the coefficients of all primary colors can take the values from 0 to 1. For example, when the value of the coefficient of the primary color R is "1.1", a difference between "1.1" and "1", namely, "0.1" will be replaced with the coefficient of other three primary colors.

At first, the coefficient of the primary color when each primary color is represented by other three primary colors is obtained in advance. "Mathematical Expression 17" is a mathematical expression when R is represented by G, C, and B; "Mathematical Expression 18" is a mathematical expression when G is represented by R, C, and B; "Mathematical Expression 19" is a mathematical expression when C is represented by R, G, and B; and "Mathematical Expression 20" is a mathematical expression when B is represented by R, G, and C.

$$\begin{pmatrix} g_R \\ c_R \\ b_R \end{pmatrix} = \begin{pmatrix} X_G & X_C & X_B \\ Y_G & Y_C & Y_B \\ Z_G & Z_C & Z_B \end{pmatrix}^{-1} \begin{pmatrix} X_R \\ Y_R \\ Z_R \end{pmatrix} \quad \text{<Mathematical Expression 17>}$$

$$\begin{pmatrix} r_G \\ c_G \\ b_G \end{pmatrix} = \begin{pmatrix} X_R & X_C & X_B \\ Y_R & Y_C & Y_B \\ Z_R & Z_C & Z_B \end{pmatrix}^{-1} \begin{pmatrix} X_G \\ Y_G \\ Z_G \end{pmatrix} \quad \text{<Mathematical Expression 18>}$$

$$\begin{pmatrix} r_C \\ g_C \\ b_C \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X_C \\ Y_C \\ Z_C \end{pmatrix} \quad \text{<Mathematical Expression 19>}$$

$$\begin{pmatrix} r_B \\ g_B \\ c_B \end{pmatrix} = \begin{pmatrix} X_R & X_G & X_C \\ Y_R & Y_G & Y_C \\ Z_R & Z_G & Z_C \end{pmatrix}^{-1} \begin{pmatrix} X_B \\ Y_B \\ Z_B \end{pmatrix} \quad \text{<Mathematical Expression 20>}$$

Where each of the coefficient (gR, cR, bR), the coefficient (rG, cG, bG), the coefficient (rC, gC, bC), and the coefficient (rB, gB, cB) is a coefficient when the primary color R, the primary color G, the primary color C, and the primary color B are represented by other three primary colors, respectively. Since XR, YR, ZR, XG, YG, ZG, XC, YC, ZC, XB, YB, and ZB are fixed values, right members of "Mathematical Expression 17" to "Mathematical Expression 20" also become fixed values.

For example, when the values of the coefficients rD, gD, cD, and bD of respective primary colors R, G, C, and B shown by "Mathematical Expression 11" or "Mathematical Expression 16" exceed 1, assuming that differences between these values and 1 are r0, g0, c0, and b0, respectively, the differences r0, g0, c0, and b0 are r0=rD−1, g0=gD−1, c0=cD−1, and b0=bD−1, respectively. The coefficients of other three primary colors for representing this differences by other primary colors are as shown in the following "Mathematical Expression 21" to "Mathematical Expression 24" from "Mathematical Expression 17" to "Mathematical Expression 20".

$$\begin{cases} g_{OR} = g_R \times r_O \\ c_{OR} = c_R \times r_O \\ b_{OR} = b_R \times r_O \end{cases} \quad \text{<Mathematical Expression 21>}$$

$$\begin{cases} r_{OG} = r_G \times g_O \\ c_{OG} = c_G \times g_O \\ b_{OG} = b_G \times g_O \end{cases} \quad \text{<Mathematical Expression 22>}$$

$$\begin{cases} r_{OC} = r_C \times c_O \\ g_{OC} = g_C \times c_O \\ b_{OC} = b_C \times c_O \end{cases} \quad \text{<Mathematical Expression 23>}$$

$$\begin{cases} r_{OB} = r_B \times b_O \\ g_{OB} = g_B \times b_O \\ c_{OB} = c_B \times b_O \end{cases} \quad \text{<Mathematical Expression 24>}$$

For example, when the coefficient of the primary color obtained in the first embodiment or the second embodiment exceeds 1, which is the highest value in R, a coefficient for allocating the difference between the value of R and 1 into three primary colors G, C, and B by using "Mathematical Expression 21" is obtained. Next, by adding the obtained g0R, c0R, and b0R to the coefficient of each primary color, the final coefficients of four primary colors R, G, C, and B (rDr, gDr, cD', and bD') are obtained (Mathematical Expression 25).

$$\begin{cases} r'_D = 1 \\ g'_D = g_D + g_{OR} = g_D + g_R \times r_O = g_D + g_R \times (r_D - 1) \\ c'_D = c_D + c_{OR} = c_D + c_R \times r_O = c_D + c_R \times (r_D - 1) \\ b'_D = b_D + b_{OR} = b_D + b_R \times r_O = b_D + b_R \times (r_D - 1) \end{cases} \quad \text{<Mathematical Expression 25>}$$

In the same way, the coefficients of the final four primary colors R, G, C, and B when the coefficients of primary colors G, C, and B exceed 1 are as shown in "Mathematical Expression 26" to "Mathematical Expression 28".

$$\begin{cases} r'_D = r_D + r_{OG} = r_D + r_G \times \\ g_O = r_D + r_G \times (g_D - 1) \\ g'_D = 1 \\ c'_D = c_D + c_{OG} = c_D + c_G \times \\ g_O = c_D + c_G \times (g_D - 1) \\ b'_D = b_D + b_{OG} = b_D + b_G \times \\ g_O = b_D + b_G \times (g_D - 1) \end{cases} \quad \text{<Mathematical Expression 26>}$$

$$\begin{cases} r'_D = r_D + r_{OC} = r_D + r_C \times \\ c_O = r_D + r_C \times (c_D - 1) \\ g'_D = g_D + g_{OC} = g_D + g_C \times \\ c_O = g_D + g_C \times (c_D - 1) \\ c'_D = 1 \\ b'_D = b_D + b_{OC} = b_D + b_C \times \\ c_O = b_D + b_C \times (c_D - 1) \end{cases} \quad \text{<Mathematical Expression 27>}$$

-continued $$\begin{cases} r'_D = r_D + r_{OB} = r_D + r_B \times \\ b_O = r_D + r_B \times (b_D - 1) \\ g'_D = g_D + g_{OB} = g_D + g_B \times \\ b_O = g_D + g_B \times (b_D - 1) \\ c'_D = c_D + c_{OB} = c_D + c_B \times \\ b_O = c_D + c_B \times (b_D - 1) \\ b'_D = 1 \end{cases} \quad \text{<Mathematical Expression 27>}$$

Forth Embodiment

In a display according to the present embodiment, one pixel is composed of four primary colors and respective primary colors are made into R, G, C, and B. Each XYZ chromaticity coordinate of these primary colors are as follows: R is (XR, YR, ZR), G is (XG, YG, ZG), C is (XC, YC, ZC), and B is (XB, YB, ZB), respectively.

The color area that can be displayed by this display is an area, which can be represented by a linear combination of each primary color vector (equivalent to "a base vector" of the present invention) (FIG. 6).

It is assumed that the user wishes to display an arbitrary color D (XD, YD, ZD) by four primary colors.

With respect to the combinations using three primary colors among four primary colors, namely, RGC (FIG. 6B), GCB (FIG. 6C), RCB (FIG. 6D), and RGB (FIG. 6E); and the combinations including the above-described combinations and the coefficient of other color of the highest value 1, namely, RGC+B (FIG. 6F), GCB+R (FIG. 6G), RCB+G (FIG. 6H), and RGB+C (FIG. 6I), the coefficients of four primary colors R, G, C, and B representing the color D will be obtained by using "Mathematical Expression 29" to "Mathematical Expression 36". With respect to the combinations, namely, RGC+B (FIG. 6F), GCB+R (FIG. 6G), RCB+G (FIG. 6H), and RGB+C (FIG. 6I), four signals will be obtained from three signals. However, since four signals to be obtained include a signal of a fixed value 1, three signals should be obtained by a calculation from three inputted signals in each conversion step. Therefore, these combinations can be easily obtained as the same as the third embodiment.

$$\begin{pmatrix} r_{31} \\ g_{31} \\ c_{31} \end{pmatrix} = \begin{pmatrix} X_R & X_G & X_C \\ Y_R & Y_G & Y_C \\ Z_R & Z_G & Z_C \end{pmatrix}^{-1} \begin{pmatrix} X_D \\ Y_D \\ Z_D \end{pmatrix} \quad \text{<Mathematical Expression 29>}$$

$$\begin{pmatrix} g_{32} \\ c_{32} \\ b_{32} \end{pmatrix} = \begin{pmatrix} X_G & X_C & X_B \\ Y_G & Y_C & Y_B \\ Z_G & Z_C & Z_B \end{pmatrix}^{-1} \begin{pmatrix} X_D \\ Y_D \\ Z_D \end{pmatrix} \quad \text{<Mathematical Expression 30>}$$

$$\begin{pmatrix} r_{33} \\ c_{33} \\ b_{33} \end{pmatrix} = \begin{pmatrix} X_R & X_C & X_B \\ Y_R & Y_C & Y_B \\ Z_R & Z_C & Z_B \end{pmatrix}^{-1} \begin{pmatrix} X_D \\ Y_D \\ Z_D \end{pmatrix} \quad \text{<Mathematical Expression 31>}$$

$$\begin{pmatrix} r_{34} \\ g_{34} \\ b_{34} \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X_D \\ Y_D \\ Z_D \end{pmatrix} \quad \text{<Mathematical Expression 32>}$$

$$\begin{pmatrix} r_{35} \\ g_{35} \\ c_{35} \end{pmatrix} = \begin{pmatrix} X_R & X_G & X_C \\ Y_R & Y_G & Y_C \\ Z_R & Z_G & Z_C \end{pmatrix}^{-1} \begin{pmatrix} X_D - X_B \\ Y_D - Y_B \\ Z_D - Z_B \end{pmatrix} \quad \text{<Mathematical Expression 33>}$$

-continued $$\begin{pmatrix} g_{36} \\ c_{36} \\ b_{36} \end{pmatrix} = \begin{pmatrix} X_G & X_C & X_B \\ Y_G & Y_C & Y_B \\ Z_G & Z_C & Z_B \end{pmatrix}^{-1} \begin{pmatrix} X_D - X_R \\ Y_D - Y_R \\ Z_D - Z_R \end{pmatrix} \quad \text{<Mathematical Expression 34>}$$

$$\begin{pmatrix} r_{37} \\ c_{37} \\ b_{37} \end{pmatrix} = \begin{pmatrix} X_R & X_C & X_B \\ Y_R & Y_C & Y_B \\ Z_R & Z_C & Z_B \end{pmatrix}^{-1} \begin{pmatrix} X_D - X_G \\ Y_D - Y_G \\ Z_D - Z_G \end{pmatrix} \quad \text{<Mathematical Expression 35>}$$

$$\begin{pmatrix} r_{38} \\ g_{38} \\ b_{38} \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X_D - X_C \\ Y_D - Y_C \\ Z_D - Z_C \end{pmatrix} \quad \text{<Mathematical Expression 36>}$$

The fact that all of the coefficients of three primary colors are positive values means that the color D can be represented by these three colors and such a combination will be selected. From "Mathematical Expression 33" to "Mathematical Expression 36", only three values are shown on a left member, respectively. However, the combination of solutions includes a value that is a fixed value 1 one by one and this leads to that three inputted signals are converted into three signals that are three parameters and a signal representing intensities of four colors composed of one signal that is one fixed value.

Here, for example, in the case that the color D is located on a hexahedron represented by the combination of three primary colors RGB and the combination of three primary colors RGC when the coefficient of the primary color B is 1, the all values of the coefficients of "Mathematical Expression 32" to "Mathematical Expression 33" are positive values. By selecting these combinations and weighting and averaging the coefficient values of the primary colors, the coefficients rD, gD, cD, and bD of four primary colors RGCB for displaying the target color D are obtained (Mathematical Expression 37).

$$\begin{cases} r_D = s \times r_{34} + t \times r_{35} \\ g_D = s \times g_{34} + t \times g_{35} \\ c_D = t \times c_{35} \\ b_D = s \times b_{34} + t \times 1 \\ s + t = 1 \ (s \cdot t > 0) \end{cases} \quad \text{<Mathematical Expression 37>}$$

If the color D is located in other area, selecting two combinations that the all coefficients of three primary colors are positive, the coefficient of each primary color may be weighted and averaged.

According to the present embodiment, since four primary colors of RGCB are obtained by using two combinations of three primary colors, it is possible to light all of four primary colors as much as possible.

Fifth Embodiment

FIG. 1 illustrates an example that processing program according to the first and third embodiments is realized by a hardware. In the drawing, reference numerals 1 to 4 denote converters for converting inputted signals of three primary colors into a mixed color A obtained by synthesis of four primary colors and two primary colors' signals among four primary colors; reference numerals 5 to 8 denote determining devices for determining if all of the outputs from the converters 1 to 4 are positive or not; a reference numeral 9 denotes a selector for selecting the combination that all of the outputs are positive depending on a determination result of the determining devices 5 to 8 and outputting that combination; a reference numeral 10 denotes a divider for converting a signal of a mixed color A into four primary colors' signals; a reference numeral 11 denotes a synthesizer for adding two primary colors' signals outputted from the selector 9 with four primary colors' signals outputted from the divider 10; and a reference numeral 12 denotes an excess processor for performing processing so that the highest value becomes 1 when a value not less than 1 is included in an output result of the synthesizer 11.

In the present embodiment, the processes to the synthesizer 11 coincide to the first embodiment and the process of the excess processor 12 coincides to the third embodiment.

At first, the signals of X, Y, and Z are inputted in the converters 1 to 4, respectively. In the converters 1 to 4, calculations of "Mathematical Expression 6" to "Mathematical Expression 9" according to the first embodiment are carried out and two primary colors' signals and a mixed color signal are outputted, respectively. The outputs from the converters 1 to 4 are inputted in the selector 9 and the determining devices 5 to 8. The determining device may determine if all of outputs from the converter are positive or not and it may output the determination result to the selector 9. The selector 9 may output a result of a combination that all values are positive on the basis of the results of the determining devices 5 to 8. Among the outputs of the selector 9, the values of two primary colors among four primary colors are inputted in the synthesizer 11, and the value of the mixed color A is inputted in the divider 10. The divider 10 may perform calculation of "Mathematical Expression 10" of the first embodiment and may output the result to the synthesizer 11. The synthesizer 11 may perform calculation of "Mathematical Expression 11" of the first embodiment and may output the result to the excess processor 12. The excess processor 12 may carry out the processing of the third embodiment if there is the output value of the synthesizer 11 exceeding the highest value and may output the signal of four primary colors. If there is no output value exceeding the highest value, the excess processor 12 may output the output value of the synthesizer 11 as it is.

Sixth Embodiment

Figure 2:
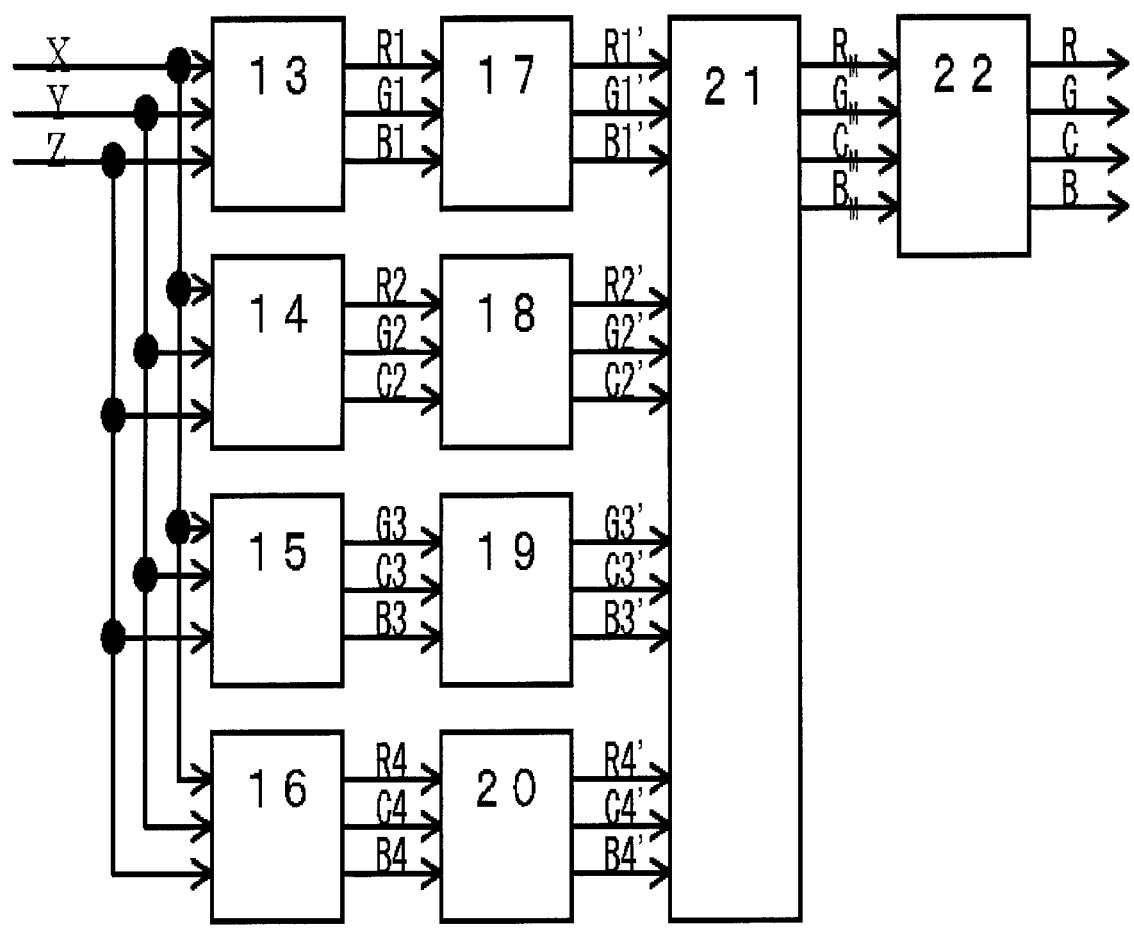
FIG. 2 illustrates other constitutional example of a hardware according to the present invention.

FIG. 2 illustrates other example that the present invention is realized by a hardware. In the drawing, reference numerals 13 to 16 denote converters for converting inputted signals of three primary colors into the values of three primary colors among four primary colors; reference numerals 17 to 20 denote determining devices for determining if all of the outputs from the converters 13 to 16 are positive or not and outputting the output value of the converter if all of the outputs are positive; a reference numeral 21 denotes a synthesizer for weighting and averaging the output result of the determining device; and a reference numeral 22 denotes an excess processor for performing processing so that the highest value becomes 1 when a value not less than the highest value is included in the output result of the synthesizer 22.

In the present embodiment, the processes to the synthesizer 21 coincide to the second embodiment and the process of the excess processor 22 coincides to the third embodiment.

At first, the signals of X, Y, and Z are inputted in the converters 13 to 16, respectively. In the converters 13 to 16, calculations of "Mathematical Expression 12" to "Mathematical Expression 15" according to the second embodiment are carried out and three primary colors' signals are outputted. The outputs from the converters 13 to 16 are inputted in the determining devices 17 to 20. The determining device may determine if all of output results from the converter are positive or not. Then, the determining device may output the output result of the converter as it is when all of the output results from the converter are positive and it does not output a result when any negative value is included in the output result of the determining device. The synthesizer 21 may synthesize the output result from the determining devices 17 to 20 using "Mathematical Expression 16" of the second embodiment and may output it. The excess processor 22 may carry out the processing of the third embodiment if there is the output value of the synthesizer 21 exceeding the highest value and may output the signal of four primary colors. If there is no output value exceeding the highest value, the excess processor 22 may output the output value of the synthesizer 21 as it is.

Seventh Embodiment

Figure 3:
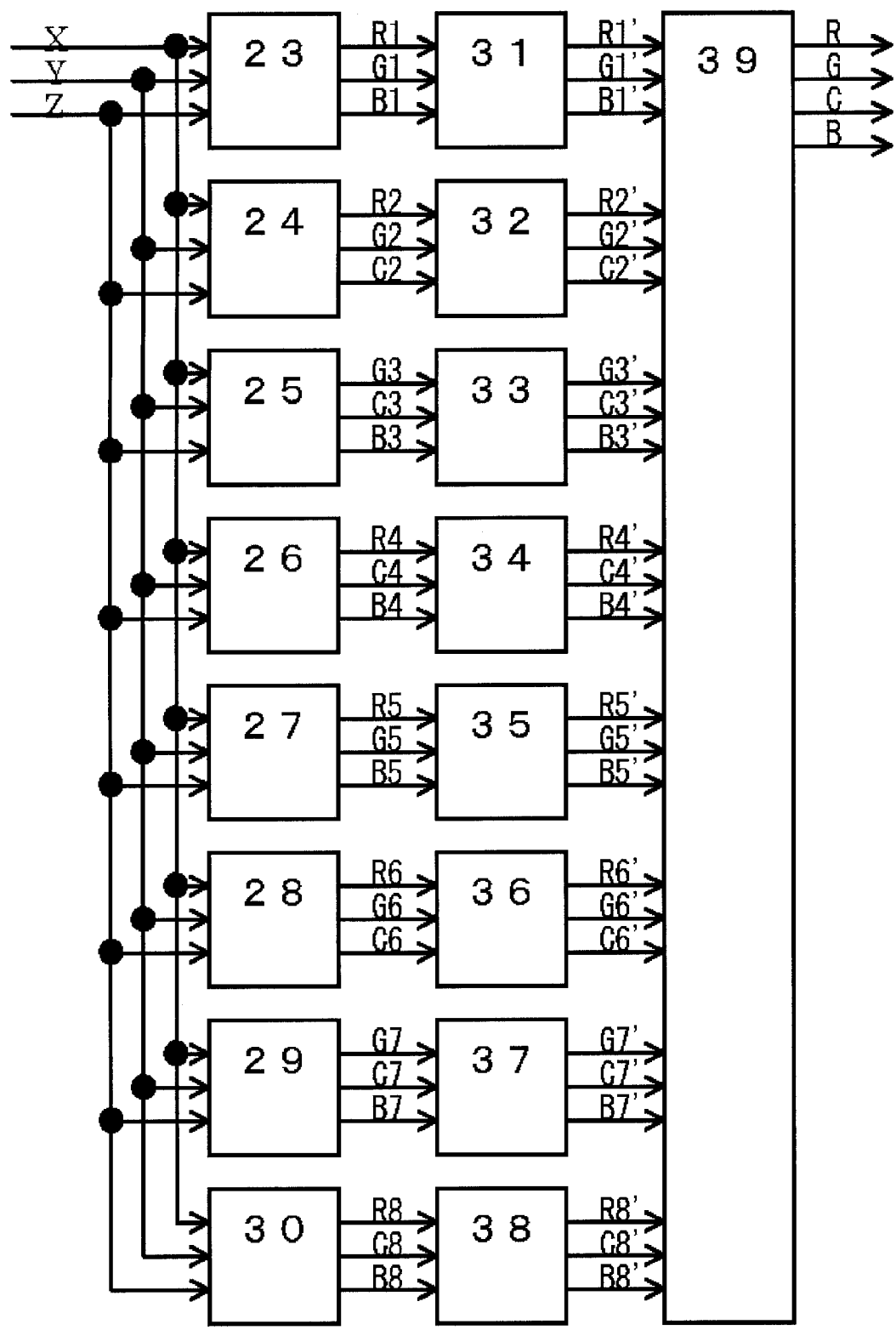
FIG. 3 illustrates further other constitutional example of a hardware according to the present invention.

FIG. 3 illustrates other example that the present invention is realized by a hardware. In the drawing, reference numerals 23 to 30 denote converters for converting inputted signals of three primary colors into the values of three primary colors among four primary colors; reference numerals 31 to 38 denote determining devices for determining if all of the outputs from the converters 23 to 30 are positive or not and outputting the output value of the converter if all of the outputs are positive; and a reference numeral 39 denotes a synthesizer for weighting and averaging the output result of the determining device.

The operation of the present embodiment coincides to the fourth embodiment.

At first, the signals of X, Y, and Z are inputted in the converters 23 to 30, respectively. In the converters 23 to 30, calculations of "Mathematical Expression 29" to "Mathematical Expression 36" according to the forth embodiment are carried out and three primary colors' signals are outputted. The outputs from the converters 23 to 30 are inputted in the determining devices 31 to 38. The determining device may determine if all of output results from the converter are positive or not. Then, the determining device may output the output result of the converter as it is when all of the output results from the converter are positive and it does not output a result when any negative value is included in the output result of the determining device. The synthesizer 39 may synthesize the output result from the determining devices 31 to 38 using "Mathematical Expression 37" of the fourth embodiment and may output it.

In the embodiments 1 to 7, as a color coordinate system, the CIE 1931 color coordinate system is used; however, other color coordinate system also can be used.

In addition, in the embodiments 5 to 7, as a color signal to be inputted, X, Y, and Z are used; however, a color signal of other color coordinate system to specify a color by three signals such as R, G, and B can be used. For example, it is also possible to directly convert the R, G, and B signals and to perform conversion according to the above-described each embodiment after converting the R, G, and B signals into the X, Y, and Z signals.

In addition, in the embodiments 5 to 7, an example of the configuration of a hardware is illustrated; however, the configuration of the hardware is not limited to these embodiments if the present invention can be practiced.

Further, other color space such as L*a*b* space may be used.

In addition, as a color of the sub-pixel of a display, the structure to use a red sub-pixel, a blue sub-pixel, a green sub-pixel, and a cyan sub-pixel can be preferably employed; however, the color of the sub-pixel is not limited to this embodiment. The color of sub-pixel can be arbitrarily selected by selecting a material of a luminous body if the display is a self-luminous display. In addition, if the display is configured so as to select a specific wavelength from the light outputted from a light source by a filter like a liquid crystal display, a color of the sub-pixel can be arbitrarily set by setting an optical property of the filter. For example, in the case of employing a read sub-pixel, it is not necessary that a chromaticity of red of the sub-pixel is the same as the chromaticity of red defined by NTSC. This applies to other colors of the sub-pixel.

According to the present embodiment, since all of four primary colors can be lighted other than the furthest outline by (1) converting a tristimulus value into three colors using one mixed color mixing two primary colors among four primary colors with four primary colors and three colors to convert the mixed color into four colors; or (2) weighting and averaging a plurality of combinations of three primary colors, it is possible to improve an image quality and to prevent a visual interception. In addition, a signal processing method can be realized, whereby a processing speed can be improved by a simple method without using division.

This application claims priority from Japanese Patent Application No. 2005-259454 filed Sep. 7, 2005 and Japanese Patent Application No. 2006-221449 filed Aug. 15, 2006 which are hereby incorporated by reference herein.

What is claimed is:

1. A signal processing method comprising the steps of:
inputting three signals specifying a color of one pixel; and
generating four signals from the input three signals, wherein said four signals represents intensity of respective one of four different colors to display a color of one pixel by mixing colors,
wherein said generating step includes
a first converting step of converting the input three signals to two signals representing intensities of two colors among the four colors and a signal representing intensity of a mixed color obtained by mixing (a) the four colors or (b) a plurality of colors among the four colors; and
a second converting step of converting the signal representing intensity of the mixed color to a plurality of signals representing intensities of a plurality of colors including at least other two colors different from the two colors.

2. The signal processing method according to claim 1, wherein said mixed color is a color, which is obtained by mixing at least said other two colors.

3. The signal processing method according to claim 1, wherein said mixed color is a color, which is obtained by mixing said four colors or a plurality of colors among said four colors in a predetermined mixture ratio; and
in said second converting step, a signal representing the intensity of said mixed color is converted into a signal representing the intensities of said four colors or said plurality of colors in accordance with said mixture ratio.

4. The signal processing method according to claim 1, wherein said mixed color is a color, which is obtained by mixing at least one of said two colors with said other two colors;
further, said method comprising the step of synthesizing a signal representing an intensity of one color of said two colors among said plurality of colors obtained in said second converting step with a signal representing the intensity of said one color obtained in said first converting step.

5. The signal processing method according to claim 1,
wherein said first converting step is carried out in each of the different combinations of two colors, respectively, so as to obtain the signals for each of combinations; and
said second converting step is carried out on the basis of a result of said first converting step that all of the values of the signal representing the intensities of said two colors and the signal representing the intensity of said mixed color are positive.

6. A color signal processing method, comprising the steps of:
inputting three signals specifying a color of one pixel; and
generating four signals from said inputted three signals, wherein each of said four signals represents intensity of respective one of different four colors for displaying a color of one pixel by mixing colors;
wherein said generating step comprising:
a first converting step of converting said inputted three signals into three signals representing the intensities of three colors among said four colors;
a second converting step of converting said inputted three signals into three signals representing the intensities of three colors of a combination that is different from the combination of said three colors; and
a synthesizing step of synthesizing three signals obtained in said first converting step with a signal representing the intensity of the same color among three signals obtained in said second converting step.

7. The color signal processing method according to claim 6,
wherein said synthesizing step synthesizes the signals so as to satisfy $\{(u'-u'1) \times 2 + (v'-v'1) \times 2\} \times (1/2) \leq 0.015$ and $\{(u'-u'2) \times 2 + (v'-v'2) \times 2\} \times (1/2) \leq 0.015$ assuming that chromaticity of u'v' of a pixel displayed by using three signals obtained in said first converting step is (u'1, v'1); chromaticity of u'v' of a pixel displayed by using three signals obtained in said second converting step is (u'2, v'2); and chromaticity of u'v' of a pixel displayed by using four signals obtained as a result of synthesis is (u', v').

8. A color signal processing method, comprising the steps of:
inputting three signals specifying a color of one pixel; and
generating four signals from said inputted three signals, wherein each of said four signals represents intensity of respective one of different four colors for displaying a color of one pixel by mixing colors;
wherein said generating step comprising:
a first converting step of converting said inputted three signals into three or four signals representing the intensities of three or four colors of a first combination among eight combinations comprising (i) four combinations for picking up three colors from said four colors and (ii) four combinations fixing a value of any one color among said four colors at the highest value;
a second converting step of converting said inputted three signals into three or four signals representing the intensities of three or four colors of a second combination, which is different from said first combination among said eight combinations; and
a synthesizing step of synthesizing a signal of three or four signals of said first combination obtained in said first converting step with a signal representing the intensity of the same color among three or four signals of said second combination obtained in said second converting step.

9. The color processing method according to claim 1, comprising:
a replacing step of replacing a difference between said value and said highest value with a signal representing the intensities of other three colors when any value of said generated four signals exceeds the set highest value.

10. The color processing method according to claim 6, comprising:
a replacing step of replacing a difference between said value and said highest value with a signal representing the intensities of other three colors when any value of said generated four signals exceeds the set highest value.

11. The color processing method according to claim 8, comprising:
a replacing step of replacing a difference between said value and said highest value with a signal representing the intensities of other three colors when any value of said generated four signals exceeds the set highest value.

12. A signal processing method of converting a point on a three-dimensional color space into a point on a four-dimensional color space made of four base vectors, comprising:
a first step of calculating a value of a coefficient for representing a point on a three-dimensional color space by a linear combination of two base vectors among said four base vectors and a first vector represented by a linear combination of said four base vectors;
a second step of calculating values of coefficients of four base vectors from the value of the coefficient of the first vector, which is calculated in said first step; and
a step of calculating a value of a coefficient for representing a point on a four-dimensional color space by a linear combination of four base vectors from among the values of the coefficients of two base vectors obtained in said first step and the values of the coefficients of four base vectors obtained in said second step.

13. A signal processing method of converting a point on a three-dimensional color space into a point on a four-dimensional color space made of four base vectors, comprising:
a first step of calculating a value of a coefficient for representing a point on a three-dimensional color space by a linear combination of three base vectors of the four base vectors;
a second step of calculating a value of a coefficient for representing the point on a three-dimensional color space by a linear combination of three base vectors of other combination different from combination of said three base vectors in the first step; and
a third step of calculating a value of a coefficient for representing a point on a four-dimensional color space by a linear combination of four base vectors from among the value of the coefficient calculated in the first step and the value of the coefficient calculated in the second step.

14. A signal processing method of converting a point on a three-dimensional color space into a point on a four-dimensional color space made of four base vectors, comprising:
a first step of calculating a value of a coefficient for representing a point on a three-dimensional color space by a linear combination of three base vectors of one combination selected from eight combinations comprising four combinations for picking up three base vectors from said four base vectors and four combinations fixing a value of coefficient of any one base vector among said four base vector at the highest value;
a second step of calculating a value of a coefficient for representing the point on a three-dimensional color space by a linear combination of three base vectors of other combination different from said one combination; and a third step calculating a value of a coefficient for representing a point on a four-dimensional color space by a linear combination of four base vectors from among the value of the coefficient calculated in the first step and the value of the coefficient calculated in the second step.

15. An image display apparatus, comprising:
a data conversion circuit of converting three signals to be inputted into said four signals by using a signal processing method according to claim 1;
a driving circuit of outputting a driving signal on the basis of said four signals; and
a display element of displaying an image in accordance with a driving signal to be outputted from said driving circuit.

16. An image display apparatus, comprising:
a data conversion circuit of converting three signals to be inputted into said four signals by using a signal processing method according to claim 6;
a driving circuit of outputting a driving signal on the basis of said four signals; and
a display element of displaying an image in accordance with a driving signal to be outputted from said driving circuit.

17. An image display apparatus, comprising:
a data conversion circuit of converting three signals to be inputted into said four signals by using a signal processing method according to claim 8;
a driving circuit of outputting a driving signal on the basis of said four signals; and
a display element of displaying an image in accordance with a driving signal to be outputted from said driving circuit.

18. A television apparatus, comprising:
the image display apparatus according to claim 15; and
a receiving circuit of supplying image data to said image display apparatus by receiving a television signal.

* * * * *